(12) United States Patent
Sano

(10) Patent No.: US 10,578,859 B2
(45) Date of Patent: Mar. 3, 2020

(54) OPTICAL FILTER INCLUDING RING-SHAPED ELECTRODE HAVING A SLIT

(71) Applicant: Seiko Epson Corporation, Tokyo (JP)

(72) Inventor: Akira Sano, Shiojiri (JP)

(73) Assignee: Seiko Epson Corporation (JP)

( * ) Notice: Subject to any disclaimer, the term of this patent is extended or adjusted under 35 U.S.C. 154(b) by 114 days.

(21) Appl. No.: 15/887,123

(22) Filed: Feb. 2, 2018

(65) Prior Publication Data

US 2018/0172976 A1 Jun. 21, 2018

Related U.S. Application Data

(63) Continuation of application No. 14/684,725, filed on Apr. 13, 2015, now Pat. No. 9,921,403, which is a continuation of application No. 13/038,583, filed on Mar. 2, 2011, now Pat. No. 9,030,743.

(30) Foreign Application Priority Data

Mar. 15, 2010 (JP) ................................. 2010-057290

(51) Int. Cl.
*G02B 27/00* (2006.01)
*G02B 26/00* (2006.01)
*G01J 3/26* (2006.01)
*G02B 6/293* (2006.01)

(52) U.S. Cl.
CPC .............. *G02B 26/001* (2013.01); *G01J 3/26* (2013.01); *G02B 6/29358* (2013.01)

(58) Field of Classification Search
CPC ...... G02B 5/28; G02B 5/284; G02B 6/29358; G02B 5/285; G02B 5/288; G02B 26/001; G01J 3/26

USPC ....... 359/578, 577, 579, 237, 238, 239, 290, 359/291, 295; 356/450, 451, 454, 480, 356/505, 506, 519
See application file for complete search history.

(56) References Cited

U.S. PATENT DOCUMENTS

| | | |
|---|---|---|
| 4,301,492 A | 11/1981 | Paquin et al. |
| 4,862,317 A | 8/1989 | Kuisma |
| 5,142,414 A | 8/1992 | Koehler |

(Continued)

FOREIGN PATENT DOCUMENTS

| | | |
|---|---|---|
| EP | 2120082 A1 | 11/2009 |
| JP | 02-195223 A | 8/1990 |

(Continued)

OTHER PUBLICATIONS

Extended European Search report dated Jul. 1, 2011 (8 pages).

*Primary Examiner* — Arnel C Lavarias
(74) *Attorney, Agent, or Firm* — Harness, Dickey & Pierce, P.L.C.

(57) ABSTRACT

An optical filter includes: a first substrate; a second substrate opposed to the first substrate; a first reflecting film provided to the first substrate; a second reflecting film provided to the second substrate and opposed to the first reflecting film; a first electrode provided to the first substrate in a peripheral area of the first reflecting film; a second electrode provided to the first substrate in a peripheral area of the first electrode; a third electrode provided to the second substrate and opposed to the first electrode; and a fourth electrode provided to the second substrate and opposed to the second electrode.

7 Claims, 17 Drawing Sheets

(56) References Cited

U.S. PATENT DOCUMENTS

| | | |
|---|---|---|
| 6,813,291 B2 | 11/2004 | Wang et al. |
| 7,106,514 B2 | 9/2006 | Murata et al. |
| 7,265,477 B2 | 9/2007 | Wan |
| 9,030,743 B2 | 5/2015 | Sano |
| 2005/0146241 A1 | 7/2005 | Wan |
| 2007/0171531 A1* | 7/2007 | Nakamura ............ G02B 26/001 359/580 |
| 2007/0242920 A1 | 10/2007 | Lin et al. |
| 2010/0226029 A1 | 9/2010 | Funasaka |
| 2011/0222157 A1 | 9/2011 | Sano |
| 2012/0147380 A1 | 6/2012 | Matsushita et al. |
| 2012/0200926 A1 | 8/2012 | Matsushita |

FOREIGN PATENT DOCUMENTS

| | | |
|---|---|---|
| JP | 06-213613 A | 8/1994 |
| JP | 11-142752 | 5/1999 |
| JP | 2001-221913 A | 8/2001 |
| JP | 2005-338534 A | 12/2005 |
| JP | 2009-134028 A | 6/2009 |
| JP | 2009-244498 A | 10/2009 |
| JP | 2010-008644 A | 1/2010 |
| JP | 2011-191492 A | 9/2011 |
| WO | WO-02-075872 A1 | 9/2002 |
| WO | WO-2007-022326 A2 | 2/2007 |

* cited by examiner

| NO | TRANSMISSION PEAK WAVELENGTH | GAP | FIRST ELECTRODE | | | | | | |
|---|---|---|---|---|---|---|---|---|---|
| | | | FIRST SEGMENT ELECTRODE | | | SECOND SEGMENT ELECTRODE | | | |
| | | | VOLTAGE (ELECTRICAL POTENTIAL DIFFERENCE) | PERIOD | VOLTAGE VARIATION | VOLTAGE (ELECTRICAL POTENTIAL DIFFERENCE) | PERIOD | VOLTAGE VARIATION | |
| 1 | λ0 | g0 | 0 | — | — | VO1 | TO1 | — | |
| 2 | λ1 | g1 | 0 | — | — | VO2 | TO2 | ΔVO1 | |
| 3 | λ2 | g2 | 0 | — | — | VO3 | TO3 | ΔVO2 | |
| 4 | λ3 | g3 | 0 | — | — | VO4 | TO4 | ΔVO3 | |
| 5 | λ4 | g4 | 0 | — | — | VO5 | TO5 | ΔVO4 | |
| 6 | λ5 | g5 | VI1 | TI1 | — | VO5 | TI1 | — | |
| 7 | λ6 | g6 | VI2 | TI2 | ΔVI1 | VO5 | TI2 | — | |
| 8 | λ7 | g7 | VI3 | TI3 | ΔVI2 | VO5 | TI3 | — | |
| 9 | λ8 | g8 | VI4 | TI4 | ΔVI3 | VO5 | TI4 | — | |

(SECOND ELECTRODE = 0V)

FIG. 7

| NO | TRANSMISSION PEAK WAVELENGTH [nm] | GAP [nm] | FIRST SEGMENT ELECTRODE VOLTAGE [V] | FIRST SEGMENT ELECTRODE VOLTAGE VARIATION [V] | SECOND SEGMENT ELECTRODE VOLTAGE [V] | SECOND SEGMENT ELECTRODE VOLTAGE VARIATION [V] |
|---|---|---|---|---|---|---|
| 1 | 700 | 300 | 0 | | 16.9 | |
| 2 | 660 | 280 | 0 | 0 | 21.4 | 4.5 |
| 3 | 620 | 260 | 0 | 0 | 25 | 3.6 |
| 4 | 580 | 240 | 0 | 0 | 27.6 | 2.6 |
| 5 | 540 | 220 | 0 | 0 | 29.8 | 2.2 |
| 6 | 500 | 200 | 16.4 | 16.4 | 29.8 | 0 |
| 7 | 460 | 180 | 22.2 | 5.8 | 29.8 | 0 |
| 8 | 420 | 160 | 26.3 | 4.1 | 29.8 | 0 |
| 9 | 380 | 140 | 29.3 | 3.0 | 29.8 | 0 |

FIG.11

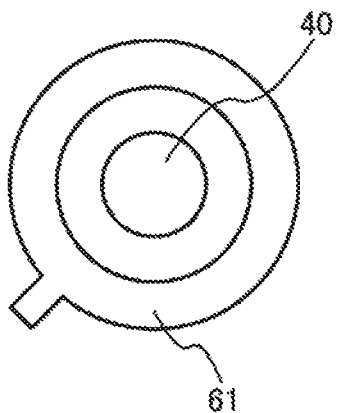
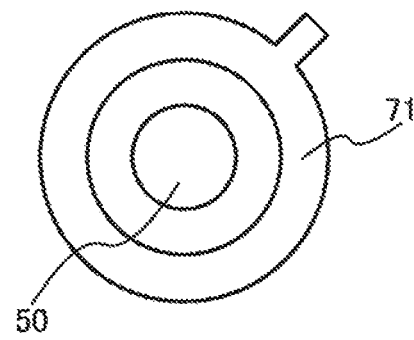
FIG.14A  FIG.14B
| NO | TRANSMISSION PEAK WAVELENGTH [nm] | GAP [nm] | FIRST ELECTRODE | |
|---|---|---|---|---|
| | | | VOLTAGE [V] | VOLTAGE VARIATION [V] |
| 1 | 700 | 300 | 14.3 | |
| 2 | 660 | 280 | 18.1 | 3.8 |
| 3 | 620 | 260 | 21.1 | 3.0 |
| 4 | 580 | 240 | 23.3 | 2.2 |
| 5 | 540 | 220 | 25.2 | 1.9 |
| 6 | 500 | 200 | 26.8 | 1.6 |
| 7 | 460 | 180 | 28.0 | 1.2 |
| 8 | 420 | 160 | 29.1 | 1.1 |
| 9 | 380 | 140 | 30.0 | 0.9 |
FIG.15

OPTICAL FILTER INCLUDING RING-SHAPED ELECTRODE HAVING A SLIT

CROSS-REFERENCE TO RELATED APPLICATIONS

This is a continuation patent application of U.S. application Ser. No. 14/684,725 filed Apr. 13, 2015, which is a continuation patent application of U.S. application Ser. No. 13/038,583 filed Mar. 2, 2011, now U.S. Pat. No. 9,030,743 issued May 12, 2015, which claims priority to Japanese Patent Application No. 2010-057290 filed Mar. 15, 2010, all of which are hereby expressly incorporated by reference herein in their entireties.

BACKGROUND

1. Technical Field

The present invention relates to an optical filter, an optical filter module, an analytical instrument, and an optical apparatus.

2. Related Art

An interference filter has been proposed that has a variable transmission wavelength (See JP-A-11-142752). As shown in FIG. 3 of JP-A-11-142752, there are a pair of substrates held in parallel to each other, a pair of multilayer films (reflecting films) formed on the pair of substrates so as to be opposed to each other and have a gap with a constant distance, and a pair of electrostatic drive electrodes for controlling the gap. Such a variable wavelength interference filter generates electrostatic attractive force in accordance with a voltage applied to the electrostatic drive electrodes to control the gap, thereby making it possible to vary the center wavelength of the transmission light beam.

However, it is difficult for such a variable wavelength interference filter to obtain a gap amount with accuracy due to a variation in the drive voltage caused by noise or the like.

SUMMARY

An advantage of some aspects of the invention is to provide an optical filter, an optical filter module, an analytical instrument, and an optical apparatus that are each capable of obtaining the gap amount with accuracy.

According to one aspect of the invention, there is provided an optical filter including a first substrate, a second substrate opposed to the first substrate, a first reflecting film provided to the first substrate, a second reflecting film provided to the second substrate and opposed to the first reflecting film, a first electrode provided to the first substrate and formed in a peripheral area of the first reflecting film in a plan view, a second electrode provided to the first substrate and formed in a peripheral area of the first electrode in the plan view, a third electrode provided to the second substrate and opposed to the first electrode, and a fourth electrode provided to the second substrate and opposed to the second electrode.

According to this aspect of the invention, the third electrode is provided to the second substrate and opposed to the first electrode, and the fourth electrode is provided to the second substrate and opposed to the second electrode. Thus, as described later, the gap amount can be obtained with better accuracy as compared to the configuration of controlling the gap amount between the reflecting films with only a pair of electrodes.

According to another aspect of the invention, in the optical filter according to the above aspect of the invention, the first electrode and the second electrode are electrically isolated from each other, and the third electrode and the fourth electrode are electrically connected to each other via a connecting section.

Since the third electrode and the fourth electrode are electrically connected via the connection section, the third electrode and the fourth electrode can be used as a common electrode.

According to another aspect of the invention, in the optical filter according to the above aspect of the invention, there are further provided a first wire connected to the first electrode, and a second wire connected to the second electrode, the first electrode has a first ring-like shape, the second electrode has a second ring-like shape having a first slit, and a part of the first wire is formed in an area where the first slit is formed.

Since the second electrode has the second ring-like shape having the first slit, the first wire can be drawn from the first electrode via the first slit.

According to another aspect of the invention, in the optical filter according to the above aspect of the invention, the third electrode has a third ring-like shape, and the fourth electrode has a fourth ring-like shape.

Since the third electrode and the fourth electrode each have a ring-like shape, parallelism between the reflecting films can be kept at a high level when controlling the gap.

According to another aspect of the invention, in the optical filter according to the above aspect of the invention, the third electrode has a third ring-like shape, the fourth electrode has a fourth ring-like shape having a second slit, and the second slit overlaps the first slit in the plan view.

The second slit overlaps the first slit in the plan view. Therefore, the fourth electrode is not formed above the part of the first wire formed in the area of the first slit. Thus, even if the voltage is applied to the first wire, it is possible to prevent unwanted electrostatic attractive force from being generated between the first wire and the fourth electrode.

According to another aspect of the invention, in the optical filter according to the above aspect of the invention, there are further provided a third wire connected to the third electrode, and a fourth wire connected to the third electrode.

Since the third wire and the fourth wire are connected to the third electrode, the wiring resistance can be reduced.

According to another aspect of the invention, in the optical filter according to the above aspect of the invention, the first substrate has a first diagonal line and a second diagonal line, the first wire extends in a first direction along the first diagonal line, the second wire extends in a second direction along the first diagonal line and reverse to the first direction, the third wire extends in a third direction along the second diagonal line, and the fourth wire extends in a fourth direction along the second diagonal line and reverse to the third direction.

By thus forming the first wire, the second wire, the third wire, and the fourth wire, the parasitic capacitance between these wires can be reduced.

According to another aspect of the invention, in the optical filter according to the above aspect of the invention, a ring width of the second electrode is larger than a ring width of the first electrode, and a ring width of the fourth electrode is larger than a ring width of the second electrode.

Since the second electrode and the fourth electrode are located in an area closer to the junction section between the first substrate and the second substrate, an electrostatic attractive force that is stronger than the electrostatic attractive force between the first electrode and the second electrode is desired. Therefore, by increasing the ring width of the second electrode and the fourth electrode, the stronger electrostatic attractive force can be generated.

According to another aspect of the invention, in the optical filter according to the above aspect of the invention, the second substrate includes a first part and a second part having a thickness smaller than a thickness of the first part, the second reflecting film is provided to the first part of the second substrate, and the third electrode and the fourth electrode are provided to the second part of the second substrate.

Since the third electrode and the fourth electrode are provided to the second part having the thickness smaller than the first part, the first substrate can be moved easily when performing gap control.

According to another aspect of the invention, in the optical filter according to the above aspect of the invention, the first substrate includes a first surface and a second surface lower than the first surface, the first reflecting film is provided to the first surface, and the first electrode and the second electrode are provided to the second surface.

According to another aspect of the invention, in the optical filter according to the above aspect of the invention, there is further provided an electrical potential difference control section adapted to control an electrical potential difference between the first electrode and the third electrode, and an electrical potential difference between the second electrode and the fourth electrode.

According to another aspect of the invention, in the optical filter according to the above aspect of the invention, the electrical potential difference control section sets an electrical potential difference between the second electrode and the fourth electrode to a first electrical potential difference, and then sets an electrical potential difference between the first electrode and the third electrode to a second electrical potential difference.

Thus, as described later, the gap control can easily be performed.

According to another aspect of the invention, in the optical filter according to the above aspect of the invention, the electrical potential difference control section sets the electrical potential difference between the first electrode and the third electrode to the second electrical potential difference in a state of setting the electrical potential difference between the second electrode and the fourth electrode to the first electrical potential difference.

Since the electrical potential difference control section sets the electrical potential difference between the first electrode and the third electrode to the second electrical potential difference in a state of setting the electrical potential difference between the second electrode and the fourth electrode to the first electrical potential difference, the prompt gap control can be performed as described later.

According to another aspect of the invention, in the optical filter according to the above aspect of the invention, the electrical potential difference control section sets an electrical potential difference between the second electrode and the fourth electrode to a first electrical potential difference, sets the electrical potential difference between the second electrode and the fourth electrode to a second electrical potential difference larger than the first electrical potential difference after setting the electrical potential difference between the second electrode and the fourth electrode to the first electrical potential difference, sets an electrical potential difference between the first electrode and the third electrode to a third electrical potential difference in a state of setting the electrical potential difference between the second electrode and the fourth electrode to the second electrical potential difference, and sets the electrical potential difference between the first electrode and the third electrode to a fourth electrical potential difference larger than the third electrical potential difference in the state of setting the electrical potential difference between the second electrode and the fourth electrode to the second electrical potential difference after setting the electrical potential difference between the first electrode and the third electrode to the third electrical potential difference.

Thus, gap control in a larger number of levels can be performed. Further, since the electrical potential difference is changed from the first electrical potential difference to the second electrical potential difference larger than the first electrical potential difference, and is changed from the third electrical potential difference to the fourth electrical potential difference larger than the third electrical potential difference, prompt gap control can be performed.

According to another aspect of the invention, in the optical filter according to the above aspect of the invention, a period during which the electrical potential difference between the second electrode and the fourth electrode is set to the second electrical potential difference is longer than a period during which the electrical potential difference between the second electrode and the fourth electrode is set to the first electrical potential difference, and a period during which the electrical potential difference between the first electrode and the third electrode is set to the fourth electrical potential difference is longer than a period during which the electrical potential difference between the first electrode and the third electrode is set to the third electrical potential difference.

Thus, as described later, it is possible to place the substrates at the desired gap spacing.

According to another aspect of the invention, in the optical filter according to the above aspect of the invention, the electrical potential difference control section sets an electrical potential difference between the second electrode and the fourth electrode to a first electrical potential difference, sets the electrical potential difference between the second electrode and the fourth electrode to a second electrical potential difference larger than the first electrical potential difference after setting the electrical potential difference between the second electrode and the fourth electrode to the first electrical potential difference, sets the electrical potential difference between the second electrode and the fourth electrode to a third electrical potential difference larger than the second electrical potential difference after setting the electrical potential difference between the second electrode and the fourth electrode to the second electrical potential difference, sets an electrical potential difference between the first electrode and the third electrode to a fourth electrical potential difference in a state of setting the electrical potential difference between the second electrode and the fourth electrode to the third electrical potential difference, sets the electrical potential difference between the first electrode and the third electrode to a fifth electrical potential difference larger than the fourth electrical potential difference in the state of setting the electrical potential difference between the second electrode and the fourth electrode to the third electrical potential difference after setting the electrical potential difference between the first electrode and the third electrode to the fourth electrical potential difference, and sets the electrical potential difference between the first electrode and the third electrode to a sixth electrical potential difference larger than the fifth electrical potential difference in the state of setting the electrical potential difference between the second electrode and the fourth electrode to the third electrical potential difference after setting the electrical potential difference between the first electrode and the third electrode to the fifth electrical potential difference, an absolute value of a difference between the second electrical potential difference and the third electrical potential difference is smaller than an absolute value of a difference between the first electrical potential difference and the second electrical potential difference, and an absolute value of a difference between the fifth electrical potential difference and the sixth electrical potential difference is smaller than an absolute value of a difference between the fourth electrical potential difference and the fifth electrical potential difference.

Thus, as described later, it is possible to place the substrates at the desired gap spacing.

According to another aspect of the invention, there is provided an optical filter module including any one of the optical filters described above, and a light receiving element adapted to receive a light beam transmitted through the optical filter.

According to an aspect of the invention, there is provided an analytical instrument including any one of the optical filters described above.

According to an aspect of the invention, there is provided an optical apparatus including any one of the optical filters described above.

BRIEF DESCRIPTION OF THE DRAWINGS

Embodiments of the invention will be described with reference to the accompanying drawings, wherein like numbers reference like elements.

FIG. 7 is a characteristics table showing an example of voltage table data.

FIG. 11 is a characteristics table showing data of the embodiment regarding the electrical potential difference, the gap, and the variable wavelength shown in FIG. 7.

FIGS. 14A and 14B are plan views showing first and second electrodes of a comparative example.

FIG. 15 is a characteristics table showing data of the comparative example related to the electrical potential difference, gap, and variable wavelength.

DESCRIPTION OF EXEMPLARY EMBODIMENTS

Hereinafter, some preferred embodiments of the invention will be described in detail. It should be noted that the embodiments explained below do not limit the content of the invention as set forth in the appended claims, and all of the constituents set forth in the embodiments are not necessarily essential to the invention.

Figure 1:
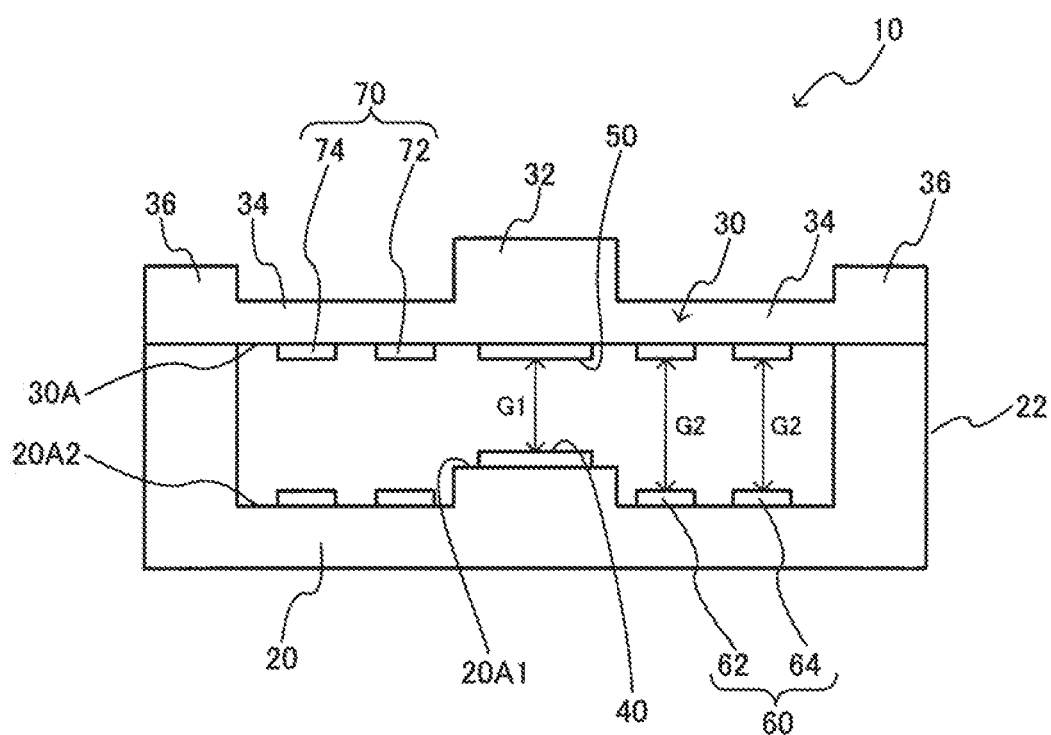
FIG. 1 is a cross-sectional view showing a non-voltage application state of an optical filter according to an embodiment of the invention.
Figure 2:
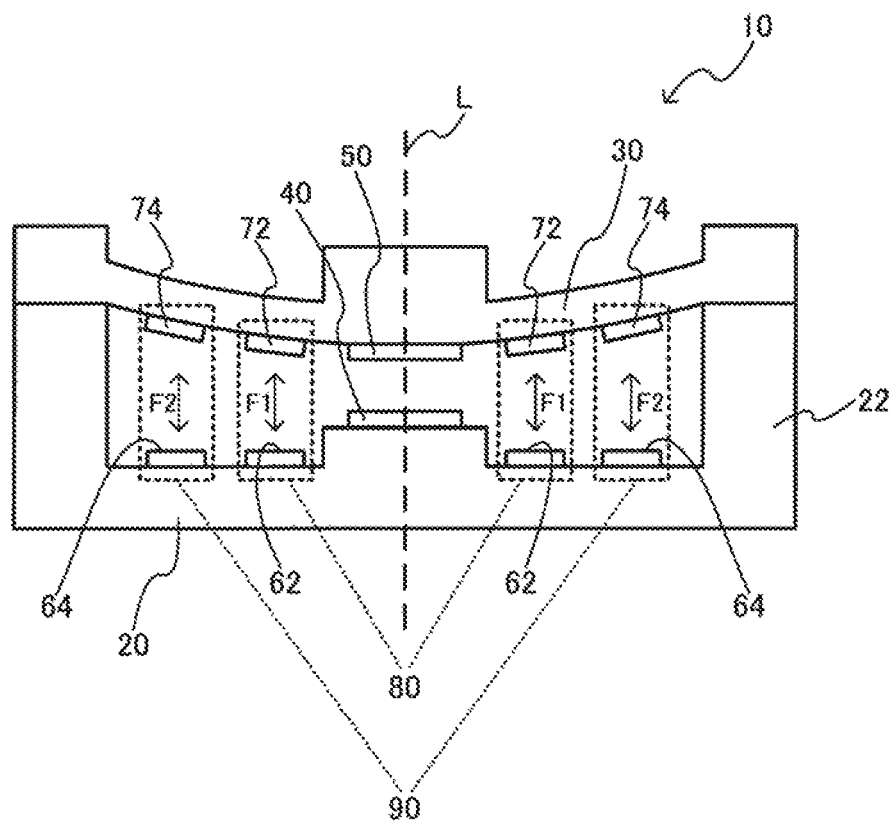
FIG. 2 is a cross-sectional view showing a voltage application state of the optical filter shown in FIG. 1.

1. Optical Filter 1.1. Filter Section of Optical Filter 1.1.1. General Description of Filter Section FIG. 1 is a cross-sectional view of an optical filter according to the present embodiment in a non-voltage application state, and FIG. 2 is a cross-sectional view thereof in a voltage application state. The optical filter 10 shown in FIGS. 1 and 2 includes a first substrate 20 and a second substrate 30 opposed to the first substrate 20. Although in the present embodiment a fixed substrate is used as the first substrate 20, and a movable substrate or diaphragm is used as the second substrate 30, it is sufficient that either one or both of the substrates can move.

In the present embodiment, a support section 22 is formed, for example, integrally with the first substrate 20, and for movably supporting the second substrate 30. The support section 22 can also be provided to the second substrate 30, or can be formed separately from the first and second substrates 20, 30.

The first and second substrates 20, 30 are each made of various types of glass such as soda glass, crystalline glass, quartz glass, lead glass, potassium glass, borosilicate glass, or alkali-free glass, a quartz crystal, or the like. Among these materials, as the constituent material of the substrates 20, 30 the glass containing alkali metal such as sodium (Na) or potassium (K) is preferable, and by forming the substrates 20, 30 using such glass materials, the adhesiveness with reflecting films 40, 50 and electrodes 60, 70 described later, and the bonding strength between the substrates can be improved. Further, these two substrates 20, 30 are bonded by, for example, surface activated bonding with a plasma-polymerized film to thereby be integrated with each other. Each of the first and second substrates 20, 30 is formed to have a square shape, for example 10 mm on a side, and the greatest diameter of the portion functioning as a diaphragm is, for example, 5 mm.

The first substrate 20 is formed by etching a glass substrate formed to have a thickness of, for example, 500 μm. The first substrate 20 is provided with a first reflecting film 40 having, for example, a circular shape formed on a first opposed surface 20A1 at a central portion of the opposed surface opposed to the second substrate 30. Similarly, the second substrate 30 is formed by etching a glass substrate formed to have a thickness of, for example, 200 μm. The second substrate 30 is provided with a second reflecting film 50 having, for example, a circular shape opposed to the first reflecting film 40 formed at a central position of an opposed surface 30A opposed to the first substrate 20.

It should be noted that the first and second reflecting films 40, 50 are each formed to have, for example, a circular shape with a diameter of about 3 mm. The first and second reflecting films 40, 50 are each a reflecting film formed of an AgC single layer, and can be provided respectively to the first and second substrates 20, 30 by a method such as sputtering. The AgC single layer reflecting film is formed to have a thickness dimension of, for example, 0.03 μm. Although in the present embodiment there is described an example of using the reflecting film of the AgC single layer capable of performing a dispersion operation in the entire visible light range as the first and second reflecting films 40, 50, the reflecting films are not limited thereto. It is also possible to use a dielectric multilayer film obtained by stacking laminated films of, for example, $TiO_2$ and $SiO_2$, which can perform the dispersion operation in a narrower wavelength band, but has a higher transmittance of the dispersed light beams, a narrower half-value width of the transmittance, and more preferable resolution compared to the AgC single layer reflecting film.

Further, it is possible to form antireflection films (AR) on the respective surfaces of the first and second substrates 20, 30 on the opposite side to the opposed surfaces 20A1, 20A2, and 30A thereof at positions corresponding to the first and second reflecting films 40, 50. The antireflection films are each formed by alternately stacking low refractive index films and high refractive index films, and decrease the reflectance to the visible light on the interfaces of the first and second substrates 20, 30 while increasing the transmittance thereof.

The first and second reflecting films 40, 50 are disposed so as to be opposed to each other via a first gap G1 in the non-voltage application state shown in FIG. 1. It should be noted that although in the present embodiment a fixed mirror is used as the first reflecting film 40 and a movable mirror is used as the second reflecting film 50, it is possible to make either one or both of the first and second reflecting films 40, 50 movable in accordance with the configuration of the first and second substrates 20, 30 described above.

A second opposed surface 20A2, which is located on the periphery of the first reflecting film 40 and on the periphery of the first opposed surface 20A1 of the first substrate 20 in the plan view, is provided with, for example, a lower electrode 60. Similarly, the opposed surface 30A of the second substrate 30 is provided with an upper electrode 70 so as to correspond to the lower electrode 60. The lower electrode 60 and the upper electrode 70 are disposed so as to be opposed to each other via a second gap G2. It should be noted that the surfaces of the lower and upper electrodes 60, 70 can be covered by an insulating film.

In the present embodiment, the surface of the first substrate 20 opposed to the second substrate 30 includes the first opposed surface 20A1 provided with the first reflecting film 40 and the second opposed surface 20A2 disposed in the periphery of the first opposed surface 20A1 in the plan view, and provided with the lower electrode 60. Although the first opposed surface 20A1 and the second opposed surface 20A2 can be coplanar with each other, in the present embodiment there is a step between the first opposed surface 20A1 and the second opposed surface 20A2, and the first opposed surface 20A1 is placed nearer to the second substrate 30 than the second opposed surface 20A2. Thus, the relationship of (first gap G1)<(second gap G2) is established.

The lower electrode 60 is divided into at least K (K is an integer equal to or greater than 2) segment electrodes electrically isolated from each other, and in the present embodiment, the lower electrode 60 has first and second electrodes 62, 64 as an example of K=2. Specifically, the K segment electrodes 62, 64 can be set separately to voltages different from each other, while the upper electrode 70 is a common electrode having the same electrical potential. The upper electrode 70 is also divided into third and fourth electrodes 72, 74. The third and fourth electrodes 72, 74 are not necessarily set to the common electrodes having the same electrical potential, but the structure in which the third electrode 72 and the fourth electrode 74 are electrically isolated (independently controllable) can be adopted. For example, it is also possible that the third electrode 72 and the fourth electrode 74 have the structure shown in FIG. 4A. Further, in the structure of the lower electrode 60 and the upper electrode 70, it is sufficient that the electrical potential difference between the first electrode 62 and the third electrode 72 and the electrical potential difference between the second electrode 64 and the fourth electrode 74 can be controlled independently. It should be noted that if K≥3 is satisfied, the relationship between the first and second electrodes 62, 64 described below can be applied to any two segment electrodes adjacent to each other.

In the optical filter 10 having such a structure, the first and second substrates 20, 30 have respective areas where the reflecting films (the first and second reflecting films 40, 50) are respectively formed and respective areas where the electrodes (the lower and upper electrodes 60, 70) are respectively formed as areas different from each other in the plan view, and there is no chance of stacking the reflecting film and the electrode with each other as described in JP-A-11-142752. Therefore, even if at least either one (the second substrate 30 in the present embodiment) of the first and second substrates 20, is formed as a movable substrate, the reflecting film and the electrode are not stacked with each other, and therefore, the movable substrate can be assured to easily deflect. Moreover, unlike JP-A-11-142752, since the reflecting films are not formed on the lower and upper electrodes 60, 70, even if the optical filter 10 is used as a transmissive or reflecting variable wavelength interference filter, the restriction that light transmissive electrodes are used as the lower and upper electrodes 60, 70 does not arise. It should be noted that since even the light transmissive electrode affects the transmission characteristics, by eliminating the formation of the reflecting film on the lower and upper electrodes 60, 70, the optical filter 10 as a transmissive variable wavelength interference filter can be provided with desired transmission characteristics.

Further, in the optical filter 10 by applying the common voltage (e.g., the ground voltage) to the upper electrode 70 disposed in the periphery of the second reflecting film 50 in the plan view, and applying voltages independent of each other to the respective K segment electrodes 62, 64 constituting the lower electrode 60 disposed in the periphery of the first reflecting film 40 in the plan view to thereby act the electrostatic attractive force indicated by the arrow between the opposed electrodes as shown in FIG. 2, the first gap G1 between the first and second reflecting films 40, 50 can be varied so as to have a value smaller than the initial gap.

In other words, as shown in FIG. 2 showing the optical filter in the voltage application state, a first gap variable drive section (an electrostatic actuator) 80 composed of the first electrode 62 and the upper electrode 70 opposed thereto, and a second gap variable drive section (an electrostatic actuator) 90 composed of the second electrode 64 and the upper electrode 70 opposed thereto are driven independently.

As described above, by providing the plurality (K) of gap variable drive sections 80, 90 independent of each other disposed only in the periphery of the first and second reflecting films 40, 50 in the plan view, and varying two parameters, namely the values of the voltages applied respectively to the K segment electrodes 62, 64 and the number of segment electrodes selected for applying the voltage among the K segment electrodes 62, 64, the size of the gap between the first and second reflecting films 40, 50 is controlled.

It is difficult to obtain both the large gap variable range and a low sensitivity to the voltage variation due to noise or the like with the parameter of the type of voltage alone as in JP-A-11-142752. By adding the parameter of the number of electrodes as in the present embodiment, it becomes possible to generate more fine-tuned electrostatic attractive force to thereby perform fine gap adjustment in a larger gap variable range by applying the same applied voltage range to the individual segment electrodes as in the case of controlling it by voltage alone.

Here, it is assumed that the maximum value of the applied voltage is V max, and the gap can be varied in N levels. In the case in which the lower electrode is not divided into a plurality of segments, it is necessary to divide the maximum voltage V max into N to thereby assign the applied voltages. On this occasion, it is assumed that the minimum value of the voltage variation between the applied voltages different from each other is $\Delta V1$ min. In contrast, in the present embodiment, the applied voltage to each of the K segment electrodes can be assigned by dividing the maximum voltage V max into averagely (N/K). On this occasion, it is assumed that the minimum value of the voltage variation between the applied voltages different from each other applied to the same segment electrode with respect to each of the K segment electrodes is $\Delta Vkmin$. In this case, it is obvious that $\Delta V1$ min<$\Delta Vkmin$ is true.

As described above, if the voltage minimum variation $\Delta Vkmin$ can be assured to be large, the gap variation can be reduced even when the applied voltages to the K (first and second) electrodes 62, 64 vary in a certain extent due to the noise depending on the power supply variation and the environment. In other words, the sensitivity to the noise becomes low, or the voltage sensitivity becomes lower. Thus, gap control with high accuracy becomes possible, and it is not necessarily required to perform feedback control on the gap, which is required in JP-A-11-142752. Further, even if the feedback control is performed on the gap, since the sensitivity to the noise is low, early settling can be achieved.

In the present embodiment, to ensure bending of the second substrate 30 as the movable substrate, an area where the upper electrode 70 is formed is formed as a thin-wall section 34 with a thickness dimension of, for example, 50 μm as shown in FIG. 1. The thin-wall section 34 is formed to have a wall thickness thinner than a thick-wall section of the area where the second reflecting film 50 is disposed and a thick-wall section 36 of the area having contact with the support section 22. In other words, in the second substrate 30 the surface 30A where the second reflecting film 50 and the upper electrode 70 are formed is a flat plane, the thick-wall section 32 is formed in a first area where the second reflecting film 50 is disposed, and the thin-wall section 34 is formed in a second area where the upper electrode 70 is formed. As described above, by making the thick-wall section 32 difficult to bend while assuring the bendability with the thin-wall section 34, it becomes possible to vary the gap while keeping the second reflecting film 50 flat.

It should be noted that although in the present embodiment the independent (K) gap variable drive sections are each constituted with an electrostatic actuator composed of a pair of electrodes, it is also possible to replace at least one of those electrostatic actuators with another actuator such as a piezoelectric element. It should be noted that the electrostatic actuator for providing attractive force in a non-contact manner causes little interference between gap variable drive sections, and is therefore suitable for controlling the gap with high accuracy. In contrast thereto, in the case, for example, in which two piezoelectric elements are disposed between the first and second substrates 20, 30, there is caused a phenomenon, for example, that the piezoelectric element, which is not driven, acts to hinder the gap variation caused by the other piezoelectric element, which is driven, and a harmful effect is caused in the method of driving two or more gap variable drive sections independently of each other. From that point of view, the plurality of gap variable drive sections is preferably composed of the electrostatic actuators.

1.1.2. Lower Electrode

Figure 3A:
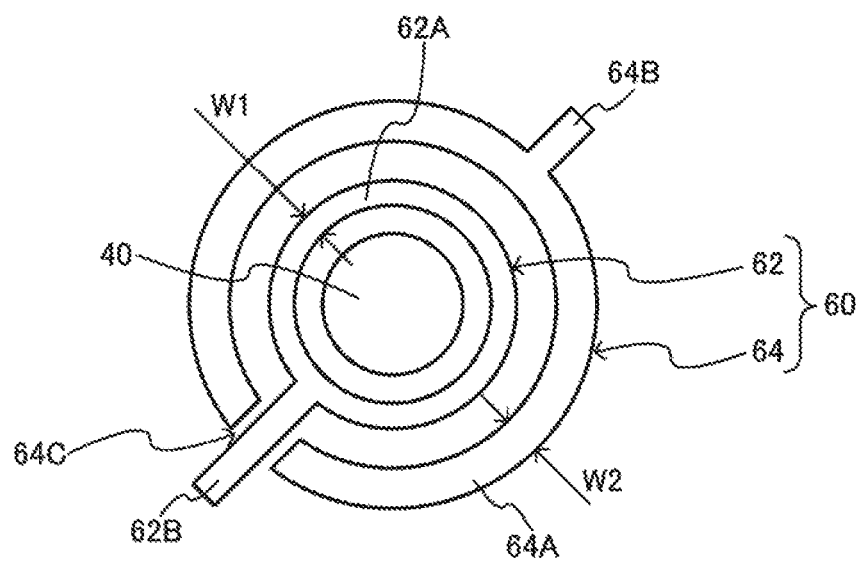
FIG. 3A is a plan view of a lower electrode.

As shown in FIG. 3A, the K segment electrodes 62, 64 constituting the lower electrode 60 can be arranged to have ring-like shapes concentric with each other around the center of the first reflecting film 40. Specifically, the first electrode 62 has a first ring-like electrode section 62A, the second electrode 64 has a second ring-like electrode section 64A outside the first ring-like electrode section 62A, and each of the ring-like electrode sections 62A, 64A is formed to have the concentric ring-like shape with respect to the first reflecting film. It should be noted that a "ring-like shape" and a "ring shape" are terms not limited to the shape of an endless ring, but include a discontinuous ring shape, and are not limited to the shape of a circular ring, but include the shapes of a rectangular ring, polygonal ring, and so on.

According to this configuration, as shown in FIG. 2, the first and second electrodes 62, 64 are in an axisymmetric arrangement with respect to the center line L of the first reflecting film 40. According to this configuration, since the electrostatic attractive forces F1, F2 acting between the lower and upper electrodes 60, 70 in response to application of the voltages acts thereon axisymmetrically with respect to the center line L of the first reflecting film 40, parallelism between the first and second reflecting films 40, 50 is enhanced.

It should be noted that as shown in FIG. 3A, the ring width W2 of the second electrode 64 can be set larger than the ring width W1 of the first electrode 62 (W2>W1). This is because the electrostatic attractive force is proportional to the area of the electrode, and it is desired that the electrostatic attractive force F2 generated by the second electrode 64 is stronger than the electrostatic attractive force F1 generated by the first electrode 62. In more detail, the second electrode 64 located outside is disposed nearer to the support section 22 of the substrates which functions as a hinge section as compared to the first electrode 62. Therefore, it is desired for the second electrode 64 to generate an electrostatic attractive force F2 strong enough to overcome the resistive force at the support section (the hinge section) 22. The second electrode 64 located outside has a larger diameter than that of the first electrode 62 located inside, and therefore, even if the widths are the same (W1=W2), the area of the second electrode 64 is larger. Therefore, although it is also possible to make the widths equal to each other (W1=W2), the ring width W2 is made larger to thereby make it possible to further increase the area to increase the electrostatic attractive force F2 generated by the second electrode 64. In particular, in the case in which the second electrode 64 located outside is driven prior to the first electrode 62 as described later, since the initial gap G2 between the second electrode 64 and the upper electrode 70 is large, it is advantageous in view of the fact that it is possible to make the area of the second electrode 64 larger to thereby increase the electrostatic attractive force F2 generated there. On that occasion, since the gap is made smaller when starting to drive the first electrode 62 located inside as long as the drive state of the second electrode 64 is maintained, there is no harmful effect on driving if the ring width W1 of the first electrode 62 is small.

Here, a first lead wire 62B is connected to the first electrode 62, and a second lead wire 64B is connected to the second electrode 64. The first and second lead wires 62B, 64B are formed so as to extend in radial directions from the center of the first reflecting film 40, for example. There is provided a first slit 64C for making the second ring-like electrode section 64A of the second electrode 64 discontinuous. The first lead wire 62B extending from the first electrode 62 located inside is drawn to the outside of the second electrode 64 via the first slit 64C provided to the second electrode 64 located outside.

As described above, in the case of making the first and second electrodes 62, 64 respectively have the ring-like electrode sections 62A, 64A, a taking-out path for the first lead wire 62B of the first electrode 62 located inside can easily be assured by the first slit 64C provided to the second electrode 64 located outside.

1.1.3. Upper Electrode

The upper electrode 70 disposed on the second substrate 30 can be formed in an area of the second substrate 30 including an area opposed to the lower electrode 60 (the first and second electrodes 62, 64) provided to the first substrate 20. In the case of making the upper electrode 70 a common electrode set to the same voltage, it is possible to form the upper electrode 70 as, for example, a mat electrode.

Alternatively, the upper electrode 70 disposed on the second electrode 30 displaced with respect to the first substrate 20 as in the present embodiment can be divided into K segment electrodes similarly to the lower electrode 60. The K segment electrodes can also be arranged to have concentric ring-like shapes with respect to the center of the second reflecting film 50. According to this configuration, since the area of the electrode provided to the second substrate 30, which is movable, is reduced to the desired minimum, the rigidity of the second substrate 30 is reduced, and the bendability can be assured.

Figure 3B:
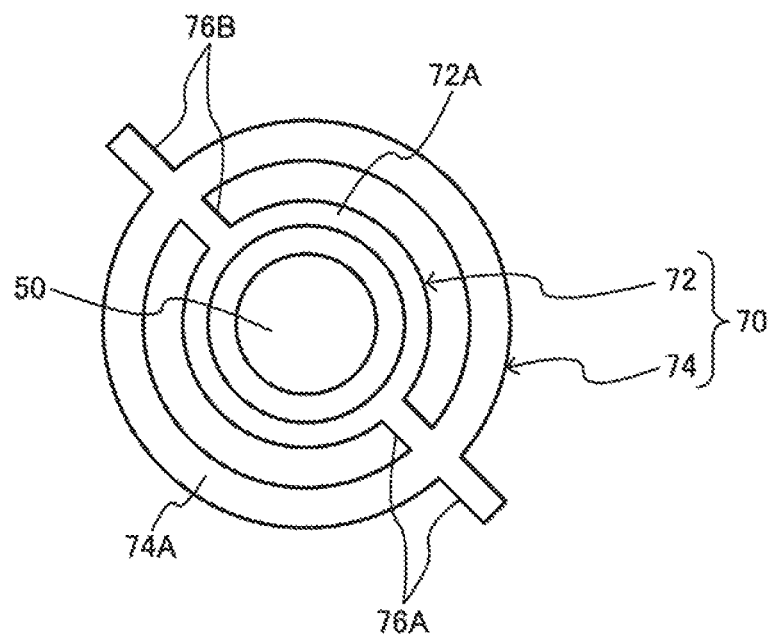
FIG. 3B is a plan view of an upper electrode of the embodiment.

As shown in FIGS. 1, 2, and 3B, the K segment electrodes constituting the upper electrode 70 can include the third electrode 72 and the fourth electrode 74. The third electrode 72 has a third ring-like electrode section 72A, the fourth electrode 74 has a fourth ring-like electrode section 74A outside the third ring-like electrode section 72A, and each of the ring-like electrode sections 72A, 74A is formed to have the concentric ring-like shape with respect to the second reflecting film. The meaning of the "concentric ring-like shape" is the same as used for the lower electrode 60. The third electrode 72 corresponds to the first electrode 62, and the fourth electrode 74 corresponds to the second electrode 64. Therefore, in the present embodiment, the ring width (equal to the ring width W2 of the second electrode 64) of the fourth electrode 74 is larger than the ring width (equal to the ring width W1 of the first electrode 62) of the third electrode 72.

Further, it is possible to electrically connect the third and fourth electrodes 72, 74 to each other to be set to the same electrical potential. In this case, third and fourth lead electrodes 76A, 76B are formed so as to extend from the center of the second reflecting film 50 in radial directions, for example. Each of the third and fourth lead electrodes 76A, 76B is electrically connected to both of the third electrode 72 located inside and the fourth electrode 74 located outside. It should be noted that since the third and fourth electrodes 72, 74 are formed as a common electrode, it is possible to connect them with a single lead electrode. However, the wiring resistance can be reduced by providing two or more lead electrodes to thereby improve the charging/discharging rate of the common electrode. It should be noted that in the case of adopting a structure in which the third and fourth electrodes 72, 74 are electrically isolated, lead electrodes corresponding respectively to the electrodes 72, 74 are provided.

1.1.4. Overlapping Area Between Lower and Upper Electrodes

Figure 4A:
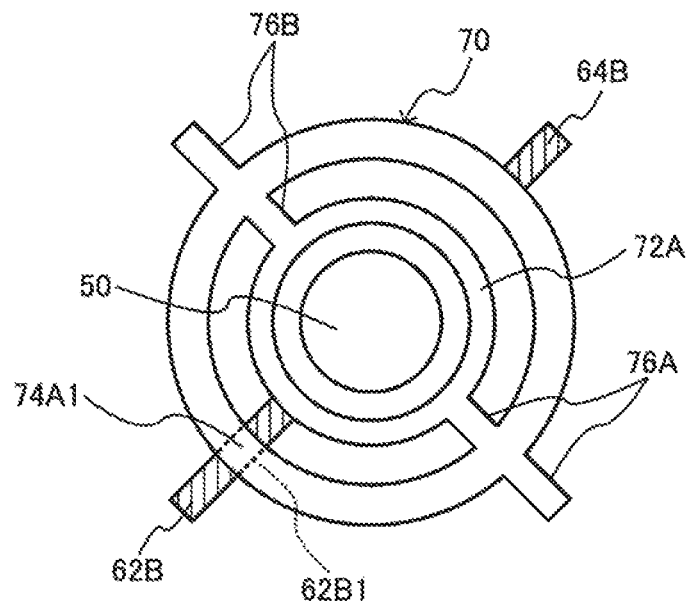
FIGS. 4A and 4B are plan views of the lower and upper electrodes in an overlapping state viewed from the side of a second substrate.

FIG. 4A shows an overlapping state in a plan view of the lower and upper electrodes 60, 70 of the present embodiment viewed from the side of the second substrate 30. In FIG. 4A, since the first and second electrodes 62, 64 are opposed to the third and fourth electrodes 72, 74 of the second electrode 70, the lower electrode 60 located on the lower side does not appear in the plan view thereof viewed from the side of the second substrate 30. Only the first and second lead wires 62B, 64B of the lower electrode 60 located on the lower side appear in the plan view viewed from the side of the second substrate 30 as indicated by hatching. Since the third ring-like electrode section 74A of the upper electrode 70 is continuous in the circumferential direction, the first lead wire 62B is opposed to the opposed area 74A1 of the third ring-like electrode section 74A in an intermediate area 62B1 thereof.

As shown in FIG. 3A, in the present embodiment since the second electrode 64 located outside out of the lower electrode 60 has a first slit 64C, the electrostatic attractive force F2 (see FIG. 2) based on the voltage applied to the second electrode 64 does not act in the area of the slit 64C.

On the other hand, since the first lead wire 62B is disposed in the first slit 64C as shown in FIG. 3A, the electrostatic attractive force F1 (see FIG. 2) acting between the first lead wire 62B having the same electrical potential as the first electrode 62 located inside and the fourth electrode 74 located outside can be generated in the first slit 64C. As an advantage of this configuration, in the case of, for example, driving the first and second electrodes 62, 64 with substantially the same voltages, uniform electrostatic attractive force can be generated in substantially the entire circumference (including the opposed area 74A1 to the first slit 64C) of the fourth electrode 74 located outside.

Figure 4B:
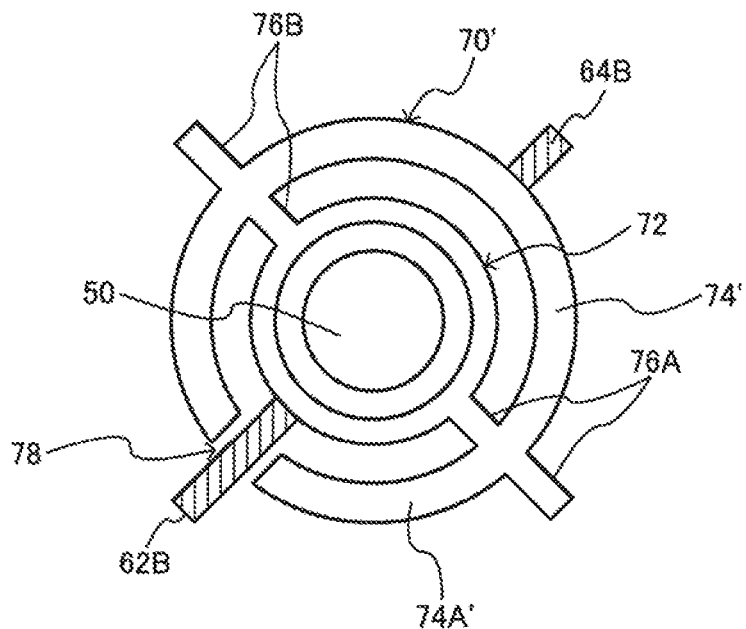

FIG. 4B shows an overlapping state in a plan view of the lower and upper electrodes 60, 70' of a modified example viewed from the side of the second substrate 30. The upper electrode 70' shown in FIG. 4B is different from the upper electrode 70 shown in FIG. 4A in the point that the fourth electrode 74 is further provided with a second slit 78 for making the fourth ring-like electrode section 74' discontinuous at the position opposed to the first slit 64C of the lower electrode 60. In other points, the upper electrode 70' shown in FIG. 4B is the same as the upper electrode 70 shown in FIG. 4A.

According to this configuration, the electrode opposed to the first lead wire 62B is eliminated. Therefore, it is possible to prevent unwanted electrostatic attractive force acting between the first lead wire 62B having the same electric potential as the first electrode located inside and a fourth electrode 74' located outside from being generated in the first slit 64C when driving the first electrode 62 located inside, for example.

1.1.5. Lead Wiring

Figure 5:
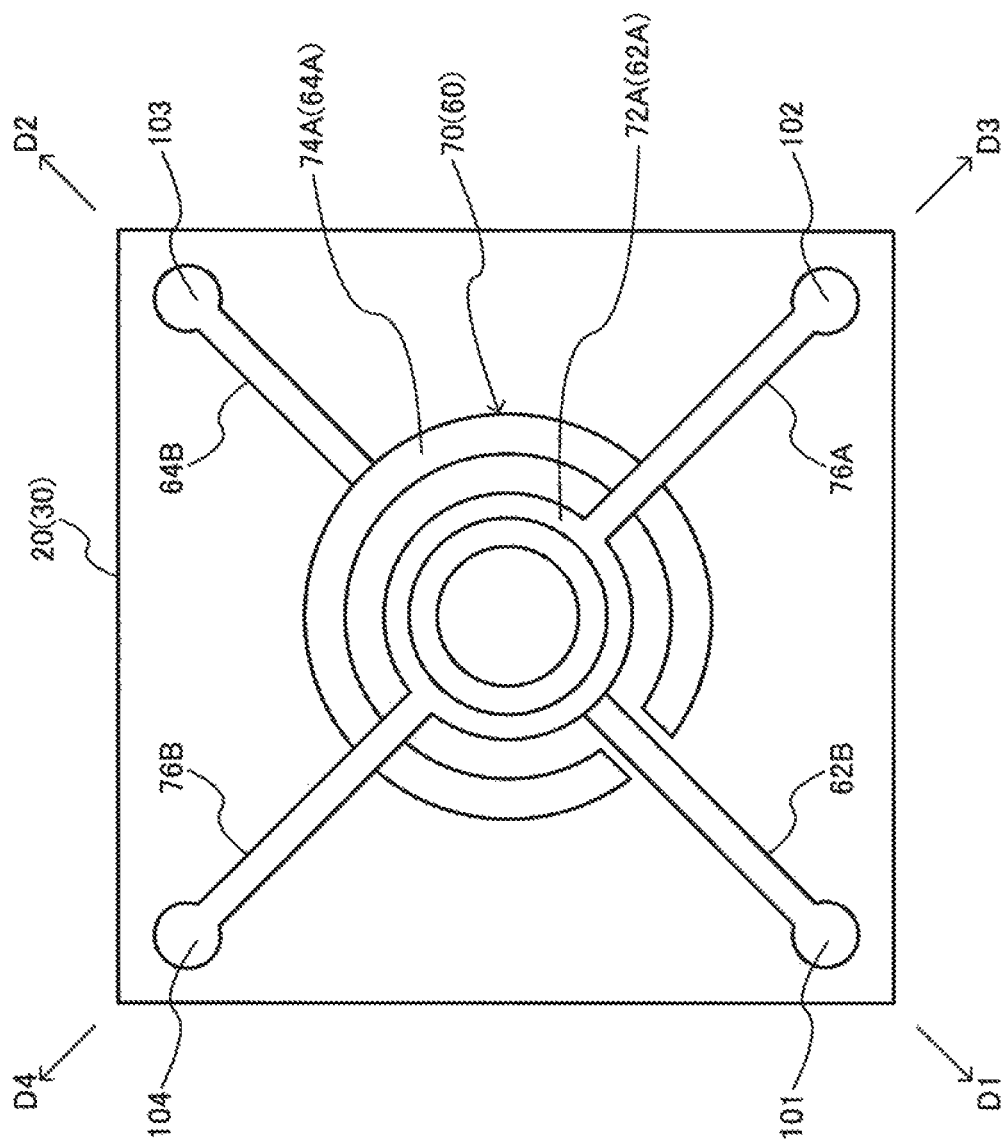
FIG. 5 is a plan view showing a wiring layout of first through fourth lead wires viewed from the side of the second substrate through the second substrate.

FIG. 5 is a plan view viewed from the side of the second substrate 30 through the second substrate 30, and shows a wiring layout of the first through fourth lead wires 62B, 64B, 76A, and 76B. In FIG. 5, at least one of the first and second substrates 20, 30 is formed as a rectangular substrate having first and second diagonal lines. In the present embodiment, each of the first and second substrates 20, 30 is formed to have a square shape, for example 10 mm on a side. Assuming that the direction in which the first lead wire 62B extends from the first electrode 62A along the first diagonal line is a first direction D1, the second lead wire 64B extends on the first diagonal line in a second direction D2 which is the reverse direction to the first direction D1. The third lead wire 76A extends in a third direction D3 along the second diagonal line. The fourth lead wire 76B extends on the second diagonal line in a fourth direction D4 which is the reverse direction to the third direction D3. Further, there are disposed first through fourth external connection electrode sections 101 through 104 located at four corners of the rectangular substrates 20, 30 in the plan view to which the first through fourth lead wires 62B, 64B, 76A, and 76B are connected respectively.

According to this configuration, firstly, the first and second lead wires 62B, 64B provided to the first substrate 20 and the third and fourth lead wires 76A, 76B provided to the second substrate 30 do not overlap with each other in the plan view, and therefore, no parallel electrodes are constituted. Therefore, the wasteful electrostatic attractive force is hardly generated between the first and second lead wires 62B, 64B and the third and fourth lead wires 76A, 76B, and further the wasteful capacitance can be reduced. Further, the wiring lengths of the first through fourth lead wires 62B, 64B, 76A, and 76B respectively to the first through fourth external connection electrode sections 101 through 104 become the shortest. Therefore, the wiring resistances and the wiring capacitances of the first through fourth lead wires 62B, 64B, 76A, and 76B are reduced, and the charging/discharging rate of the first through fourth electrodes 62, 64, 72, and 74 can be raised.

It should be noted that as the structure of the first through fourth lead wires 62B, 64B, 76A, and 76B, it is also possible to adopt a structure in which the first substrate has a first imaginary straight line and a second imaginary straight line intersecting the first imaginary straight line, the first lead wire 62B extends in a first direction along the first imaginary straight line, the second lead wire 64B extends in a second direction along the first imaginary straight line and opposite to the first direction, the third lead wire 76A extends in a third direction along the second imaginary straight line, and the fourth lead wire 76B extends in a fourth direction along the second imaginary straight line and opposite to the third direction.

It should be noted that it is also possible to provide the first through fourth external connection electrode sections 101 through 104 to either one of the first and second substrates 20, 30, or to provide some of the first through fourth external connection electrodes 101 through 104 and the rest thereof to the respective substrates 20, 30. In the case of disposing the first through fourth external connection electrodes 101 through 104 to either one of the first and second substrates 20, 30, the lead wire provided to the other of the first and second substrates 20, 30 can be connected to the external connection electrode section provided to the one of the substrates via a conductive paste or the like. It should be noted that the first through fourth external connection electrode sections 101 through 104 are connected to the outside via connection sections such as lead wires or wire bonding.

Further, the first through fourth lead wires 62B, 64B, 76A, and 76B can intersect, for example, a plasma polymeric film for bonding the first and second substrates 20, 30 to each other. Alternatively, it is also possible to draw the first through fourth lead wires 62B, 64B, 76A, and 76B to the outside beyond the bonding surface via groove sections provided to one of the bonding surfaces of the first and second substrates 20, 30.

1.2. Voltage Control System of Optical Filter

1.2.1. General Description of Application Voltage Control System

Figure 6:
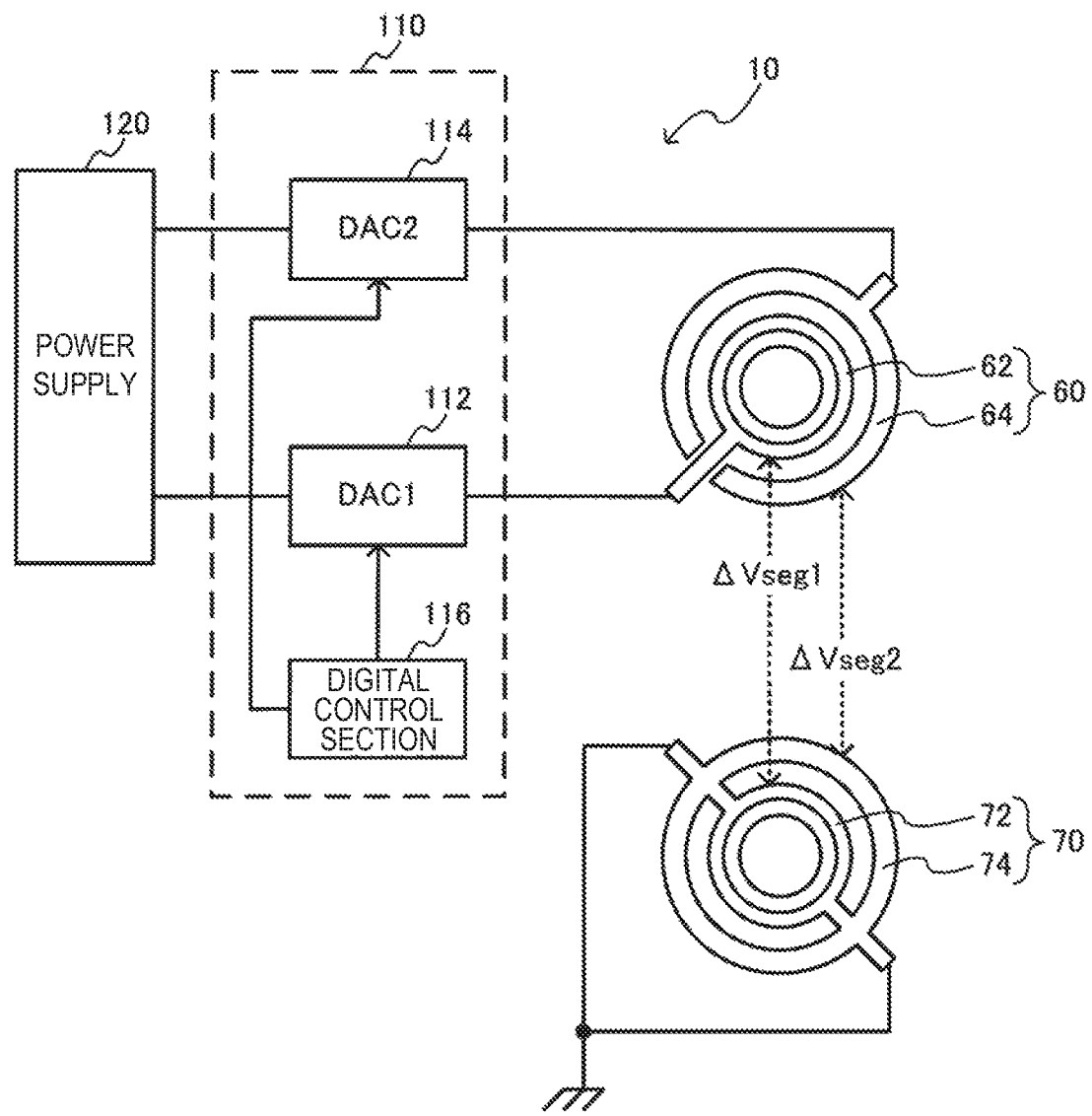
FIG. 6 is a diagram of an applied voltage control system of the optical filter.

FIG. 6 is a block diagram of an applied voltage control system of the optical filter 10. As shown in FIG. 6, the optical filter 10 has an electrical potential difference control section 110 for controlling the electrical potential difference between the lower electrode 60 and the upper electrode 70. In the present embodiment, since the upper electrode 70 (the third and fourth electrodes 72, 74) as the common electrode is fixed to a constant common voltage, for example, the ground voltage (0V), the electrical potential control section 110 varies the applied voltages to the first and second electrodes 62, as the K segment electrodes constituting the lower electrode 60 to thereby respectively control an inner electrical potential difference ΔVseg1 and an outer electrical potential difference ΔVseg2 between the respective first and second electrodes 62, 64 and the upper electrode 70. It should be noted that the upper electrode can apply the common voltage other than the ground voltage, and on that occasion, it is possible for the electrical potential difference control section 110 to control application/non-application of the common voltage to the upper electrode 70.

In FIG. 6 the electrical potential difference control section 110 includes a first electrode drive section connected to the first electrode 62 such as a first digital-analog converter (DAC1) 112, a second electrode drive section connected to the second electrode 64 such as a second digital-analog converter (DAC2) 114, and a digital control section 116 for performing control, such as digital control, on the digital-analog converters. The first and second digital-analog converters 112, 114 are supplied with voltages from a power supply 120. The first and second digital-analog converters 112, 114 are supplied with the voltages from the power supply 120, and at the same time output analog voltages corresponding to the digital values from the digital control section 116. As the power supply 120, what is implemented in an analytical instrument or an optical apparatus to which the optical filter 10 is mounted can be used, and further, a power supply dedicated to the optical filter 10 can also be used.

1.2.2. Method of Driving Optical Filter

FIG. 7 is a characteristics table showing an example of voltage table data, which is original data of the control in the digital control section 116 shown in FIG. 6. The voltage table data can be provided to the digital control section 116 itself, or implemented in the analytical instrument or the optical apparatus to which the optical filter 10 is mounted.

FIG. 7 shows an example with N=9 as the voltage table data for varying the gap between the first and second reflecting films 40, 50 in totally N levels by sequentially applying the voltages to each of the first and second electrodes 62, 64 as the K electrodes. It should be noted that in FIG. 7, the case in which the respective electrical potential differences between the first and second electrodes 62, 64 and the upper electrode 70 are 0V is not included in the N levels of gap variable range. FIG. 7 shows only the case in which the voltage value other than the voltage value (0V) of the common voltage applied to the upper electrode 70 is applied to at least one of the first and second electrodes 62, 64. It should be noted that it is also possible to define the case, in which both of the electrical potential differences between the first and second electrodes 62, 64 and the upper electrode 70 are 0V, as the maximum transmission peak wavelength.

Figure 8:
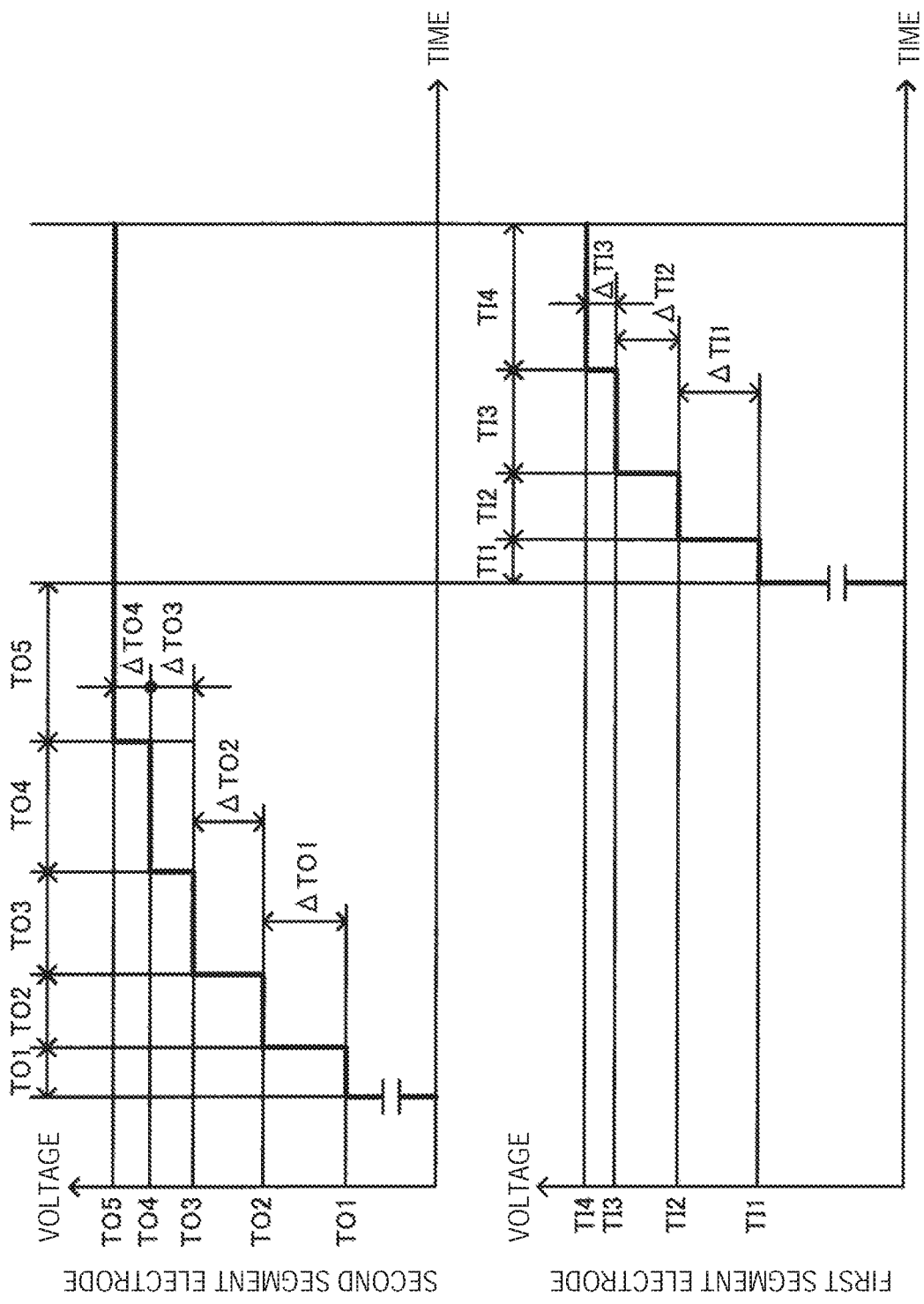
FIG. 8 is a timing chart of voltage application realized with the voltage table data.

The electrical potential difference control section 110 sets the voltage values to the respective K segment electrodes (the first and second electrodes 62, 64) in accordance with the voltage table data shown in FIG. 7, and then applies the voltage values to the respective K segment electrodes (the first and second electrodes 62, 64). FIG. 8 is a timing chart of the voltage application realized by performing the drive in the order of the data number of the voltage table data shown in FIG. 7.

As shown in FIGS. 7 and 8, L (=4) levels of voltages (VI1 through VI4; VI1<VI2<VI3<VI4) are applied to the first electrode 62, and M (=5) levels of voltages (VO1 through VO5; VO1<VO2<VO3<VO4<VO5) are applied to the second electrode 64, thereby varying the first gap G1 between the first and second reflecting films 40, 50 in 9 (N=L+M=9) levels from g0 to g8.

Figure 9:
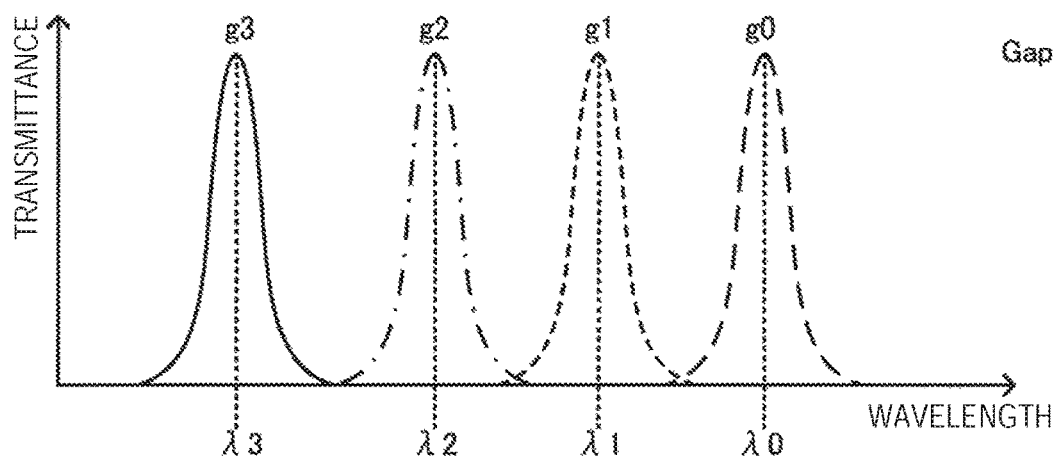
FIG. 9 is a graph showing a relationship between a gap between first and second reflecting films of the optical filter and a transmission peak wavelength.

According to the voltage control described above, the optical filter 10 can realize the wavelength transmission characteristics shown in FIG. 9. FIG. 9 shows the wavelength transmission characteristics in the case of varying the dimension of the first gap G1 between the first and second reflecting films 40, 50 in a range of, for example, g0 through g3. In the optical filter 10, when the dimension of the first gap G1 between the first and second reflecting films 40, 50 is varied in the range of, for example, g0 through g3 (g0>g1>g2>g3), the transmission peak wavelength is determined in accordance with the dimension of the first gap G1. Specifically, the wavelength λ of the light beam transmitted through the optical filter 10 satisfies the condition that the value obtained by multiplying the half wavelength (λ/2) by an integer (n) is equal to the dimension of the first gap G1 (n×λ=2G1). The light beam having the wavelength λ, which fails to satisfy the condition that the value obtained by multiplying the half wavelength (λ/2) by an integer (n) is equal to the dimension of the first gap G1, interferes itself to be attenuated in the process of being multiply-reflected by the first and second reflecting films 40, 50, and is never transmitted.

Therefore, as shown in FIG. 9, by varying the dimension of the first gap G1 between the first and second reflecting films 40, 50 sequentially to g0, g1, g2, and then g3 so as to be narrowed, the light beam transmitted through the optical filter 10 varies in the wavelength, namely the transmission peak wavelength, sequentially to λ0, λ1, λ2, and then λ3 (λ0>λ1>λ2>λ3) so as to be shortened.

Here, although the values of L, M, and N can arbitrarily be changed, the integers satisfying L≥3, M≥3, and N≥6 are preferable. If the integers satisfying L≥3, M≥3, and N≥6 are used, it is possible to switch the inner electrical potential difference ΔVseg1 and the outer electrical potential difference ΔVseg2 set respectively to the first and second electrodes 62, 64 from the first electrical potential difference ΔV1 to the second electrical potential difference ΔV2 larger than the first electrical potential difference ΔV1, and then the third electrical potential difference ΔV3 larger than the second electrical potential difference ΔV2.

As shown in FIG. 8, the electrical potential difference control section 110 firstly applies the voltages VO1 through VO5 sequentially to the second electrode 64 located outside. Since the upper electrode 70 is set to 0V, the electrical potential difference between the upper electrode 70 and the second electrode 64, namely the outer electrical potential difference Vseg2, can sequentially be increased to the first electrical potential difference VO1, the second electrical potential difference VO2, the third electrical potential difference VO3, the fourth electrical potential difference VO4, and then the fifth electrical potential difference VO5. Thus, the dimension of the first gap G1 between the first and second reflecting films 40, 50 is sequentially reduced in such a manner as g0→g1→g2→g3→g4. As a result, the wavelength λ of the light beam transmitted through the optical filter 10, namely the transmission peak wavelength, sequentially varies so as to be shortened in such a manner as λ0→λ1→λ2→λ3→λ4.

Subsequently, as shown in FIG. 8, the electrical potential difference control section 110 sequentially applies the voltages VI1 through VI4 to the first electrode located inside while keeping the application of the maximum applied voltage VO5 to the second electrode 64. Since the upper electrode 70 is set to 0V, the electrical potential difference between the upper electrode 70 and the first electrode 62, namely the inner electrical potential difference Vseg1, can sequentially be increased to the first electrical potential difference VI1, the second electrical potential difference VI2, the third electrical potential difference VI3, and then the fourth electrical potential difference VI4. Thus, the dimension of the first gap G1 between the first and second reflecting films 40, 50 is sequentially reduced in such a manner as g5→g6→g7→g8. As a result, the wavelength λ of the light beam transmitted through the optical filter 10, namely the transmission peak wavelength, sequentially varies so as to be shortened in such a manner as λ5→λ6→λ7→λ8.

Since the electrical potential difference control section 110 switches the outer electrical potential difference Vseg2 at least from the first electrical potential difference VO1 to the second electrical potential difference VO2 larger than the first electrical potential difference VO1, and further the third electrical potential difference VO3 larger than the second electrical potential difference VO2, and further switches the inner electrical potential difference Vseg1 at least from the first electrical potential difference VI1 to the second electrical potential difference VI2 larger than the first electrical potential difference VI1, and further the third electrical potential difference VI3 larger than the second electrical potential difference VI2, it is possible to suppress the damped free vibration of the second substrate 30, the movable substrate, and thus the prompt wavelength varying operation can be performed. Moreover, the electrical potential difference control section 110 applies three or more voltage values (voltage of 0 can be included) to each of the first and second electrodes 62, 64, namely applies at least the first segment voltage VI1, the second segment voltage VI2, and the third segment voltage VI3 to the first electrode 62, and applies at least the first segment voltage VO1, the second segment voltage VO2, and the third segment voltage VO3 to the second electrode 64. Therefore, it becomes possible to vary the gap in three or more levels only by driving either one of the first and second electrodes 62, 64, and therefore, it can be prevented to unnecessarily increase the number of segment electrodes of the lower electrode 60.

1.2.3. Voltage Variation (Absolute Value of Difference Between First Electrical Potential Difference and Second Electrical Potential Difference, Etc.)

The electrical potential difference control section 110 can make the absolute value of the difference between the second electrical potential difference and the third electrical potential difference smaller than the absolute value of the difference between the first electrical potential difference and the second electrical potential difference with respect to each of the inner electrical potential difference Vseg1 and the outer electrical potential difference Vseg2. Since in the present embodiment the upper electrode 70 is fixed to the common voltage of 0V, the absolute value of the difference between the first electrical potential difference and the second electrical potential difference as the outer electrical potential difference Vseg2, for example, is equivalent to the voltage variation ΔVO1 between the first segment voltage VO1 and the second segment voltage VO2 applied to the second electrode 64 as shown in FIGS. 7 and 8. As shown in FIGS. 7 and 8, the voltage variations of the outer electrical potential difference Vseg2 are in a descending relationship of ΔVO1>ΔVO2>ΔVO3>ΔVO4, and the voltage variations of the inner electrical potential difference Vseg1 are in a descending relationship of ΔVI1>ΔVI2>ΔVI3.

The reason of setting such a relationship as described above is as follows.

Figure 10:
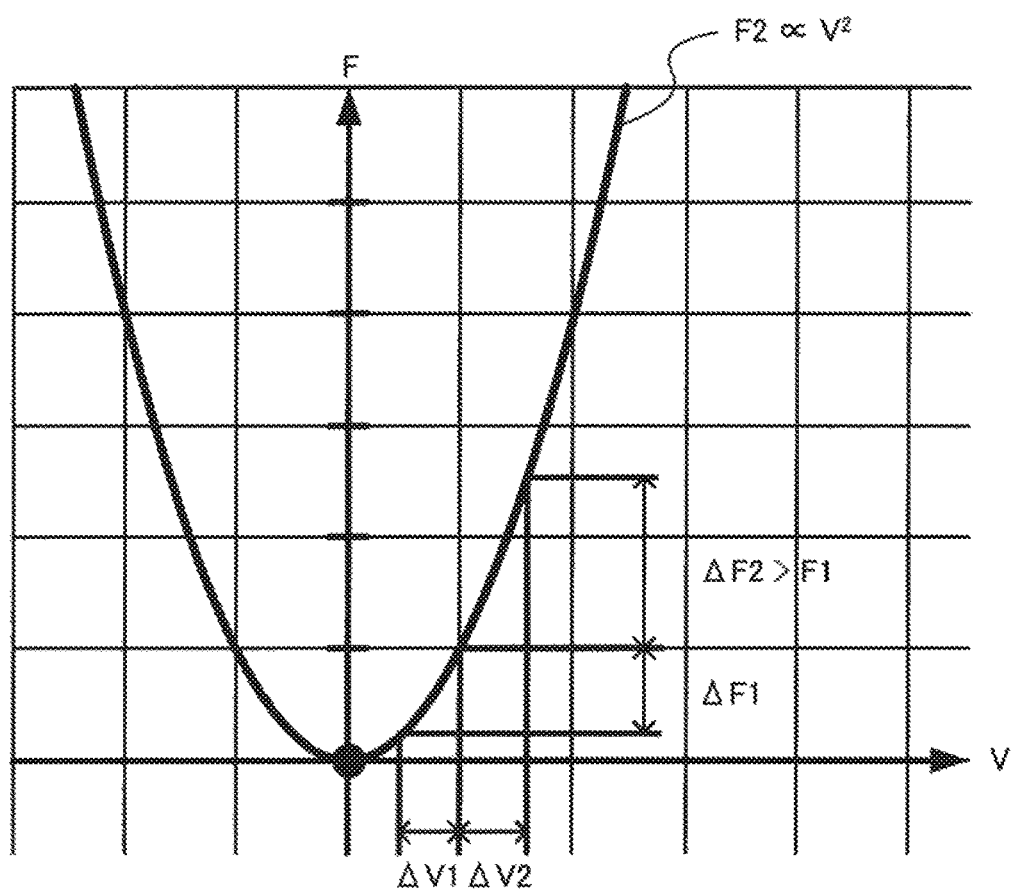
FIG. 10 is a graph showing a relationship between an electrical potential difference between the first and second electrodes and the electrostatic attractive force.

The electrostatic attractive force F can be represented as "$F=(½)\varepsilon(V/G)^2 S$." Here, ε denotes the dielectric constant, V denotes the applied voltage, G denotes an inter-electrode gap, and S denotes the opposed electrode area. According to this formula, the electrostatic attractive force F is proportional to the square of the electrical potential difference (the applied voltage V to the lower electrode 60 in the present embodiment) between the lower and upper electrodes 60, 70. FIG. 10 is a graph (the chart showing $F=V^2$) of the electrostatic attractive force F proportional to the square of the electrical potential difference V. As shown in FIG. 10, when switching the electrical potential difference V in the ascending direction to the first electrical potential difference, the second electrical potential difference, and then the third electrical potential difference, if the absolute value ΔV1 of the difference between the first electrical potential difference and the second electrical potential difference and the absolute value ΔV2 of the difference between the second electrical potential difference and the third electrical potential difference are the same (ΔV1=ΔV2 in FIG. 10), it results that the increment ΔF of the electrostatic attractive force rapidly increases from ΔF1 to ΔF2, which causes an overshoot.

Therefore, it is arranged that the absolute value ΔV2 of the difference between the second electrical potential difference and the third electrical potential difference is smaller than the absolute value ΔV1 of the difference between the first electrical potential difference and the second electrical potential difference. Thus, it is possible to suppress the rapid increase in the electrostatic attractive force when the gap is narrowed to thereby further suppress the overshoot, and thus, the prompter wavelength variation operation can be realized.

1.2.4. Voltage Application Period

The electrical potential difference control section 110 can set the period during which the electrical potential difference is set to the second electrical potential difference longer than the period during which the electrical potential difference is set to the first electrical potential difference, and the period during which the electrical potential difference is set to the third electrical potential difference longer than the period during which the electrical potential difference is set to the second electrical potential difference with respect to each of the inner electrical potential difference Vseg1 and the outer electrical potential difference Vseg2. In the present embodiment, as shown in FIG. 8, regarding the outer electrical potential difference Vseg2, the period TO2 of the second electrical potential difference VO2 is longer than the period TO1 of the first electrical potential difference VO1, the period TO3 of the third electrical potential difference VO3 is longer than the period TO2 of the second electrical potential difference VO2, and the periods are in an ascending relationship of TO1<TO2<TO3<TO4<TO5. Similarly, as shown in FIG. 8, regarding the inner electrical potential difference Vseg1, the period 112 of the second electrical potential difference VI2 is longer than the period TI1 of the first electrical potential difference VI1, the period TI3 of the third electrical potential difference VI3 is longer than the period 112 of the second electrical potential difference VI2, and the periods are in an ascending relationship of TI1<TI2<TI3<TI4.

When the second electrical potential difference larger than the first electrical potential difference is set, or the third electrical potential difference larger than the second electrical potential difference is set, the restoring force of the second substrate 30 also increases. Therefore, the time until the second substrate 30 stops becomes longer. In other words, the time until the first gap G1 between the first and second reflecting films 40, 50 is established becomes longer. In contrast, by setting the period set for the second electrical potential difference longer than the period set for the first electrical potential difference, and setting the period set for the third electrical potential difference longer than the period set for the second electrical potential difference as in the present embodiment, it is possible to establish the first gap G1 at a predetermined value.

Figure 12:
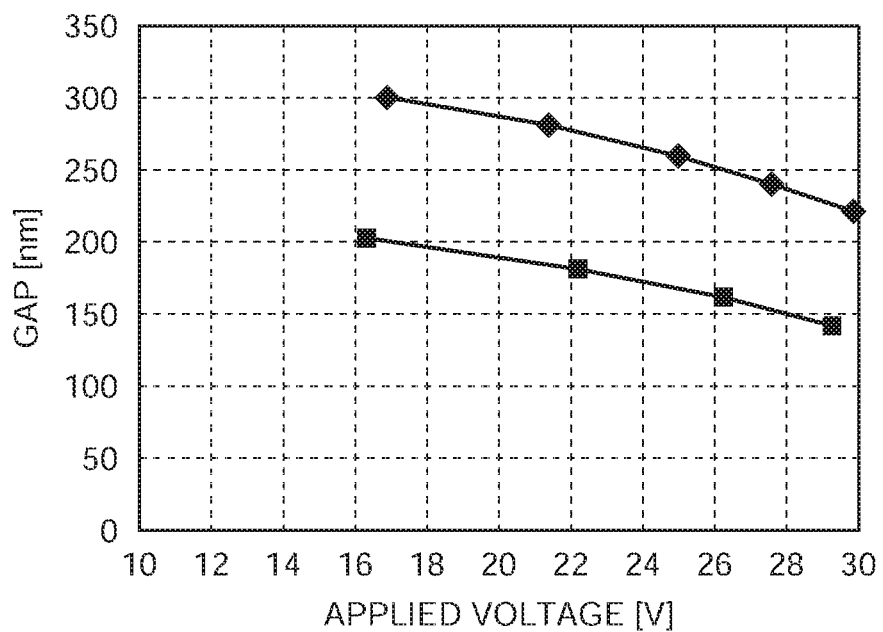
FIG. 12 is a graph showing a relationship between the applied voltage and the gap shown in FIG. 11.
Figure 13:
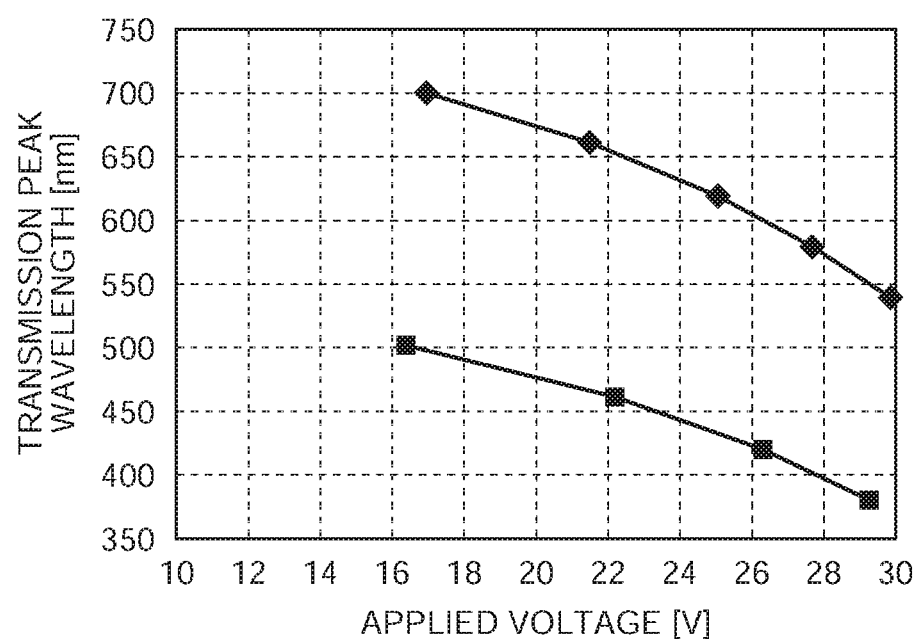
FIG. 13 is a graph showing a relationship between the applied voltage and the transmission peak wavelength shown in FIG. 11.

1.2.5. Electrical Potential Difference, Gap, and Variable Wavelength in the Embodiment FIG. 11 is a characteristics table showing data of the embodiment regarding the electrical potential difference, the gap, and the variable wavelength shown in FIG. 7. The data numbers 1 through 9 in FIG. 11 correspond to the data numbers 1 through 9 in FIG. 7. FIG. 12 is a graph showing a relationship between the applied voltage and the gap shown in FIG. 11. FIG. 13 is a graph showing a relationship between the applied voltage and the transmission peak wavelength shown in FIG. 11.

In FIG. 11, to make the transmission peak wavelength variable in 9 levels from the maximum wavelength $\lambda 0$ (=700 nm) to the minimum wavelength $\lambda 8$ (=380 nm) of the transmission peak wavelength, the first gap G1 between the first and second reflecting films 40, 50 is made variable in 9 levels from the maximum gap g0 (=300 nm) to the minimum gap g8 (=140 nm) (see also FIG. 12). In accordance therewith, the transmission peak wavelength is made variable in 9 levels from the maximum wavelength $\lambda 0$ to the minimum wavelength $\lambda 8$ (see also FIG. 13). Moreover, in FIG. 11, by setting the 9 levels of gaps g0 through g8 from the maximum gap g0 to the minimum gap g8 at regular intervals (=20 nm), the 9 levels of the wavelength $\lambda 0$ through $\lambda 8$ from the maximum wavelength $\lambda 0$ to the minimum wavelength $\lambda 8$ are also set to have regular intervals (=40 nm). By varying the dimension of the first gap G1 between the first and second reflecting films so as to sequentially decrease by a constant amount, the transmission peak wavelength is also shortened by a constant value.

The electrical potential difference control section 110 sets the outer electrical potential difference Vseg2 sequentially to VO1 (=16.9V), VO2 (=21.4V), VO3 (=25V), VO4 (=27.6V), and then VO5 (=29.8V), and then sets the inner electrical potential difference Vseg1 sequentially to VI1 (=16.4V), VI2 (=22.2V), VI3 (=26.3V), and then VI4 (=29.3V) while keeping the outer electrical potential difference Vseg2 at VO5 (=29.8V).

It should be noted that the dimension of the first gap G1 between the first and second reflecting films 40, 50 is more significantly affected by the electrostatic attractive force F1 based on the inner electrical potential difference Vseg1 than the electrostatic attractive force F2 based on the outer electrical potential difference Vseg2. Therefore, if the inner electrical potential difference Vseg1 is firstly varied, and then the outer electrical potential difference Vseg2 is varied while keeping the inner electrical potential difference Vseg1 at a constant value, since the electrostatic attractive force F1 by the inner electrical potential difference Vseg1 is dominant, the gap between the first and second reflecting films 40, does not vary so largely as the outer electrical potential difference Vseg2 varies. Therefore, in the present embodiment, the outer electrical potential difference Vseg2 is varied first, and then the inner electrical potential difference Vseg1 is varied while keeping the outer electrical potential difference Vseg2 at a constant value.

After the outer electrical potential difference Vseg2 reaches the outer maximum electrical potential difference VO5, the electrical potential difference control section 110 varies the inner electrical potential difference Vseg1 while keeping the outer electrical potential difference Vseg2 at the outer maximum electrical potential difference VO5. According to this process, a further gap variation corresponding to one step from the first gap G1 set by the outer maximum electrical potential difference VO5 becomes possible due to the application of the inner electrical potential difference Vseg1. Moreover, since the outer maximum electrical potential difference VO5 has already been reached, it is not required to further vary the outer electrical potential difference Vseg2 after the inner electrical potential difference Vseg1 is applied. Therefore, when varying the outer electrical potential difference Vseg2, no harmful influence is caused by the dominant electrostatic attractive force F1 based on the inner electrical potential difference Vseg1.

When the electrical potential difference control section 110 set the inner electrical potential difference Vseg1 to the inner maximum electrical potential difference VI4, the first gap G1 between the first and second reflecting films 40, 50 is set to the minimum distance g8. The outer maximum electrical potential difference VO5 and the inner maximum electrical potential difference VI4 can be set substantially equal to each other within a range not exceeding the maximum supply voltage V max to the electrical potential difference control section 110. In the present embodiment the maximum supply voltage V max (=30V), for example, is supplied to the electrical potential difference control section 110 from the power supply 120 shown in FIG. 6. On this occasion, the outer maximum electrical potential difference VO5 is set to 29.8V not exceeding the maximum supply voltage V max (30V), and further the inner maximum electrical potential difference VI4 is also set to 29.3V not exceeding the maximum supply voltage V max (30V).

In FIG. 11, although there exists a minute difference of 0.5V between the outer maximum electrical potential difference VO5 and the inner maximum electrical potential difference VI4, it can be said that they are substantially the same. The minute difference occurs as a result of the design made under the intention that the transmission peak wavelength is obtained using the full scale (see FIGS. 12 and 13) of the range not exceeding the maximum supply voltage V max (30V) with respect to each of the inner electrical potential difference Vseg1 and the outer electrical potential difference Vseg2. It is possible to strictly conform the outer maximum electrical potential difference VO5 and the inner maximum electrical potential difference VI4 to each other by adjusting the area ratio between the first and second electrodes 62, 64 and so on. However, there is little necessity for strictly conforming them. It should be noted that according to the drive method of the present embodiment as explained with reference to FIG. 4A, by making the outer maximum electrical potential difference VO5 and the inner maximum electrical potential difference VI4 substantially equal to each other, there is obtained an advantage that even electrostatic attractive force can be generated in almost entire circumference (including the opposed area 74A1 to the first slit 64C) of the fourth electrode 74 located outside.

In the present embodiment the electrical potential difference control section 110 sequentially applies the voltages to K (=2) electrodes, namely the first and second electrodes 62, 64 to thereby make the first gap G1 between the first and second reflecting films 40, 50 variable in totally N (=9) levels. On this occasion, the minimum value of the voltage variation between the applied voltages to be applied to the same segment electrode 62 (or 64) out of the K (=2) electrodes, namely the first and second electrodes 62, 64 is defined as $\Delta Vkmin$. In the example shown in FIGS. 7 and 11, regarding the first electrode 62, $\Delta Vkmin=\Delta VI3=3.0V$ is obtained, and regarding the second electrode 64, $\Delta Vkmin=\Delta VO4=2.2V$ is obtained. Considering the fact that the power supply noise is about 0.1V, it is obvious from the comparison with the comparative example described below that the minimum voltage value ΔVkmin has low sensitivity to the noise.

1.2.6. Comparative Example

In the comparative example, as shown in FIGS. 14A and 14B, the lower electrode 61 shown in FIG. 14A is used instead of the lower electrode 60 of the present embodiment, and the upper electrode 71 shown in FIG. 14B is used instead of the upper electrode 70 of the present embodiment. In other words, the lower and upper electrodes 61, 71 of the comparative example are not divided into segments.

Figure 16:
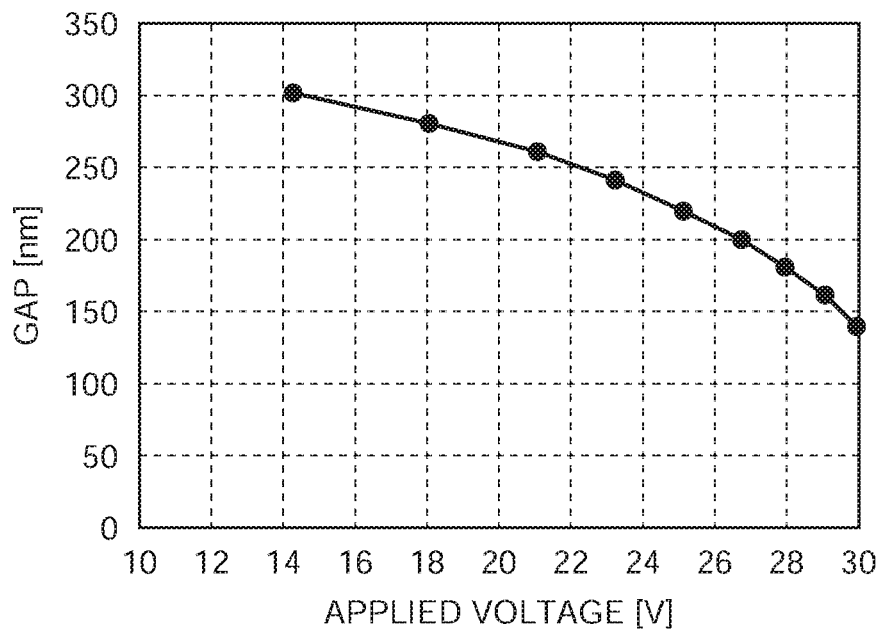
FIG. 16 is a graph showing a relationship between the applied voltage and the gap shown in FIG. 15.
Figure 17:
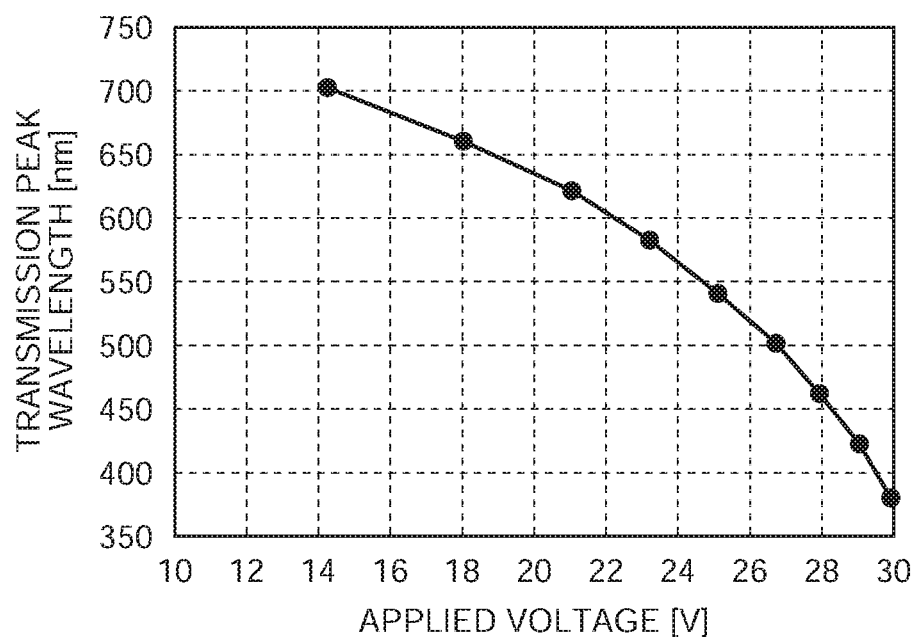
FIG. 17 is a graph showing a relationship between the applied voltage and the transmission peak wavelength shown in FIG. 15.

FIG. 15 is a characteristics table showing the data of the electrical potential difference between the lower and upper electrodes 61, 71 shown in FIGS. 14A and 14B, and the gap and the variable wavelength obtained therefrom. The data numbers 1 through 9 in FIG. 15 correspond to the data numbers 1 through 9 in FIG. 11. FIG. 16 is a graph showing a relationship between the applied voltage and the gap shown in FIG. 15. FIG. 17 is a graph showing a relationship between the applied voltage and the transmission peak wavelength shown in FIG. 15.

Also in FIG. 15, in order for making the transmission peak wavelength variable in 9 levels from the maximum wavelength λ0 (=700 nm) to the minimum wavelength λ8 (=380 nm) of the transmission peak wavelength, the first gap G1 between the first and second reflecting films 40, 50 is made variable in 9 levels from the maximum gap g0 (=300 nm) to the minimum gap g8 (=140 nm) (see also FIG. 15). In accordance therewith, the transmission peak wavelength is made variable in 9 levels from the maximum wavelength λ0 to the minimum wavelength λ8 (see also FIG. 16).

It should be noted that in the comparative example the 9 levels of voltage applied to the lower electrode 61 are set as a unique electrode within the full scale with the maximum supply voltage V max (30V).

The voltage minimum variation between the 9 levels of applied voltage in the case of forming the lower electrode 61 of a unique electrode as in the comparative example is defined as ΔV1 min. In the example shown in FIG. 15, ΔV1 min=0.9V is provided. Considering the fact that the power supply noise is about 0.1V, the voltage minimum variation ΔV1 min of the comparative example has high sensitivity to the noise.

In comparison between the voltage minimum variation ΔVkmin of the present embodiment and the voltage minimum variation ΔV1 min of the comparative example, ΔV1 min<ΔVkmin becomes true, and therefore, according to the present embodiment, the sensitivity to the noise can be reduced.

2. Modified Example of Optical Filter

Figure 18:
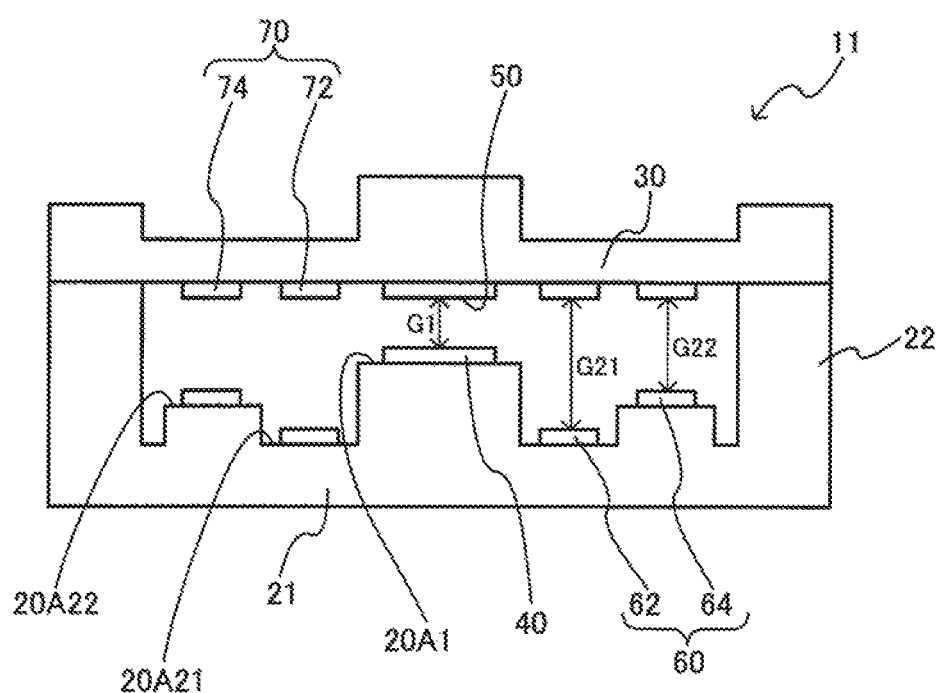
FIG. 18 is a cross-sectional view showing non-voltage application state of an optical filter according to another embodiment of the invention.

FIG. 18 shows an optical filter 11 that is different from the optical filter 10 shown in FIG. 1. A first substrate 21 shown in FIG. 18 includes the second opposed surface 20A2 provided with the lower electrode 60 in FIG. 1, a first surface 20A21 in the periphery of the first opposed surface 20A1 provided with the first reflecting film 40 in a plan view, and a second surface 20A22 disposed in the periphery of the first surface 20A21 in the plan view and different in level from the first surface 20A21.

The first electrode 62 is disposed on the first surface 20A21, the second electrode 64 is disposed on the second surface 20A22, and an initial value of a gap G22 between the second electrode 64 and the upper electrode 70 and an initial value of a gap G21 between the first electrode 62 and the upper electrode 70 are different from each other.

The reason of setting such a relationship as described above is as follows. Among the gaps G21, G22 in the initial state, the gap G22 in the initial state, which is driven first, and corresponds to the second electrode 64, is reduced by the electrostatic attractive force acting between the second electrode 64 and the upper electrode 70. On this occasion, the gap G21 is also narrowed at the same time to be smaller than the initial gap. Therefore, when starting to drive the first electrode 62, the gap G21 is smaller than the initial value.

Here, it is assumed that the first surface 20A21 and the second surface 20A22 are coplanar with each other, and the initial values of the gaps G21, G22 are the same. In this case, the gap G22 in the case of first driving the second electrode 64, for example, is larger than the gap G21 in the case of driving the first electrode 62 later. Therefore, it becomes necessary to set the electrostatic attractive force in the case of first driving the second electrode 64 to be excessively stronger than the electrostatic attractive force in the case in which the first electrode 64 is driven.

Therefore, in this case, it is preferable that to set the initial value of the gap G22 to be smaller than the initial value of the gap G21 as shown in FIG. 18. It should be noted that when the first electrode 62 is driven first, it is sufficient to set the initial value of the gap G21 to be smaller than the initial value of the gap G22.

3. Analytical Instrument

Figure 19:
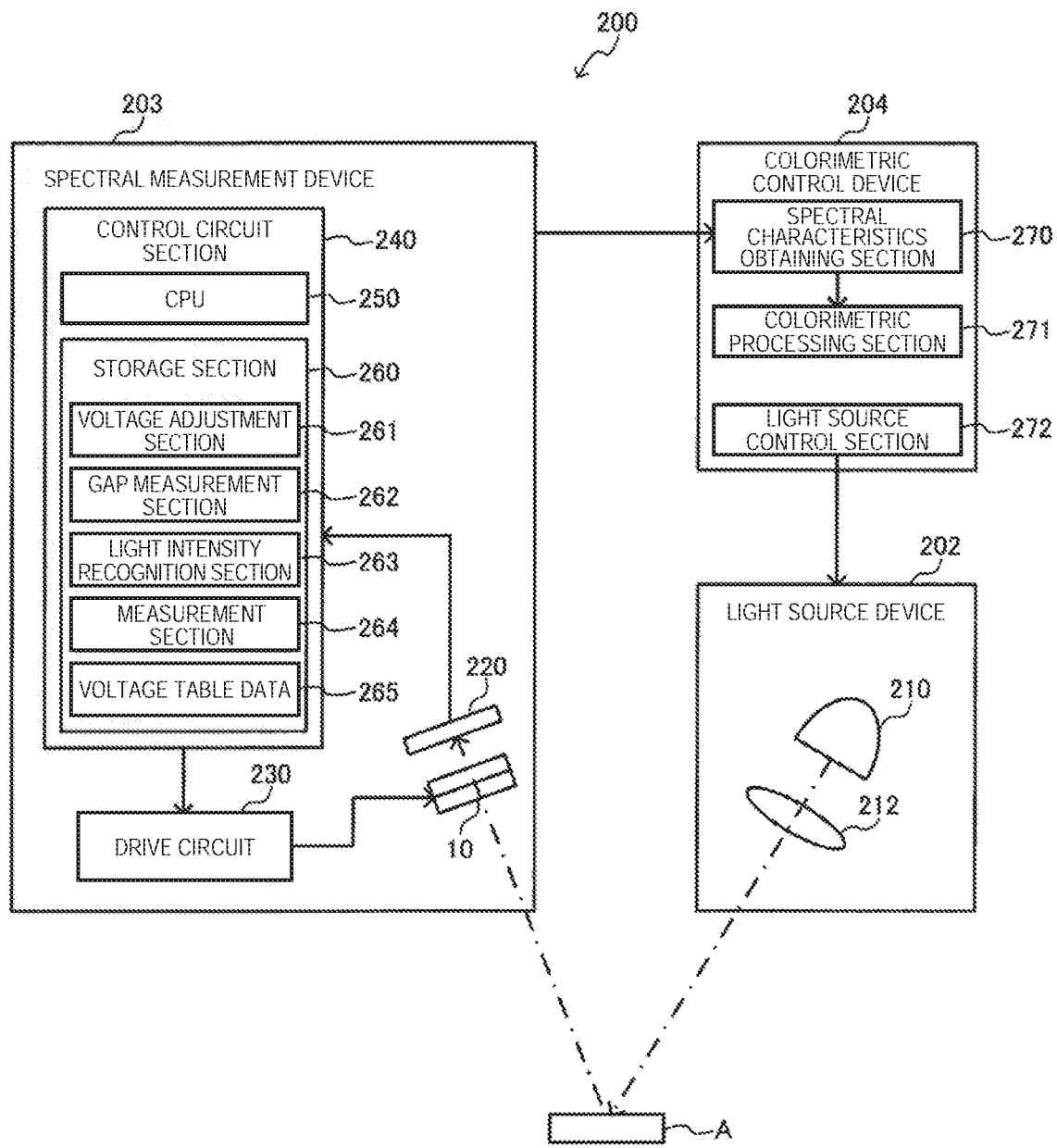
FIG. 19 is a block diagram of an analytical instrument of still another embodiment of the invention.

FIG. 19 is a block diagram showing a schematic configuration of a colorimeter as an example of an analytical instrument according to an embodiment of the invention.

In FIG. 19, the colorimeter 200 is provided with a light source device 202, a spectral measurement device 203, and a colorimetric control device 204. The colorimeter 200 emits, for example, a white light beam from the light source device 202 toward the test object A, and then input the test target light beam, the light beam reflected by the test object A, to the spectral measurement device 203. Subsequently, the colorimeter 200 disperses the test target light beam with the spectral measurement device 203, and then spectral characteristics measurement for measuring the intensity of each of the light beams with respective wavelengths obtained by the dispersion is performed. In other words, the colorimeter 200 makes the test target light beam as the light beam reflected by the test object A enter the optical filter (an etalon) 10, and then performs the spectral characteristics measurement for measuring the intensity of the light beam transmitted through the etalon 10. Subsequently, the colorimetric control device 204 performs the colorimetric process of the test object A, namely analyzes the wavelengths of the colored light beams included therein, and the proportions of the colored light beams, based on the spectral characteristics thus obtained.

The light source device 202 is provided with a light source 210 and a plurality of lenses 212 (one of the lenses is shown in FIG. 19), and emits a white light beam to the test object A. Further, the plurality of lenses 212 includes a collimator lens, and the light source device 202 modifies the white light beam emitted from the light source 210 into a parallel light beam with the collimator lens, and emits it from the projection lens not shown to the test object A.

As shown in FIG. 19, the spectral measurement device 203 is provided with the etalon 10, a light receiving section 220 including light receiving elements, a drive circuit 230, and a control circuit section 240. Further, the spectral measurement device 203 has an entrance optical lens not shown disposed at a position opposed to the etalon 10, the entrance optical lens guiding the reflected light beam (the test target light beam) reflected by the test object A into the inside thereof.

The light receiving section 220 is composed of a plurality of photoelectric conversion elements (the light receiving elements), and generates an electric signal corresponding to the received light intensity. Further, the light receiving section 220 is connected to the control circuit section 240, and outputs the electric signal thus generated to the control circuit section 240 as a light reception signal. It should be noted that it is possible to constitute an optical filter module by integrating the etalon 10 and the light receiving section (the light receiving elements) 220 as a unit.

The drive circuit 230 is connected to the lower electrode 60 and the upper electrode 70 of the etalon 10, and the control circuit section 240. The drive circuit 230 applies the drive voltage between the lower electrode 60 and the upper electrode 70 based on the drive control signal input from the control circuit section 240 to thereby displace the second substrate 30 to a predetermined displacement position. The drive voltage can be applied so that the desired electrical potential difference is caused between the lower electrode 60 and the upper electrode 70, and for example, it is also possible to apply a predetermined voltage to the lower electrode 60 while setting the upper electrode 70 to the ground potential. A direct-current voltage is preferably used as the drive voltage.

The control circuit section 240 controls overall operations of the spectral measurement device 203. As shown in FIG. 19, the control circuit section 240 is mainly composed of, for example, a CPU 250 and a storage section 260. Further, the CPU 250 performs a spectral measurement process based on various programs and various data stored in the storage section 260. The storage section 260 is configured including a recording medium such as a memory or a hard disk drive, and stores the various programs and various data so as to be arbitrarily retrieved.

Here, the storage section 260 stores a voltage adjustment section 261, a gap measurement section 262, a light intensity recognition section 263, and a measurement section 264 as a program. It should be noted that as described above the gap measurement section 262 can be omitted.

Further, the storage section 260 stores voltage table data 265 shown in FIG. 7 containing voltage values to be applied to the electrostatic actuators 80, 90 for controlling the spacing of the first gap G1 and the time periods, during which the respective voltage values are applied, in conjunction with each other.

The colorimetric control device 204 is connected to the spectral measurement device 203 and the light source device 202, and performs the control of the light source device 202 and the colorimetric process based on the spectral characteristics obtained by the spectral measurement device 203. As the colorimetric control device 204, a general-purpose personal computer, a handheld terminal, a colorimetric-dedicated computer, and so on can be used.

Further, as shown in FIG. 19, the colorimetric control device 204 is configured including a light source control section 272, a spectral characteristics obtaining section 270, a colorimetric processing section 271, and so on.

The light source control section 272 is connected to the light source device 202. Further, the light source control section 272 outputs a predetermined control signal to the light source device 202 based on, for example, a setting input by the user to thereby make the light source device 202 emit a white light beam with a predetermined brightness.

The spectral characteristic obtaining section 270 is connected to the spectral measurement device 203, and obtains the spectral characteristics input from the spectral measurement device 203.

The colorimetric processing section 271 performs the colorimetric process for measuring the chromaticity of the test object A based on the spectral characteristics. For example, the colorimetric processing section 271 performs a process of making a graph of the spectral characteristics obtained from the spectral measurement device 203, and then outputting it to an output device such as a printer or a display not shown.

Figure 20:
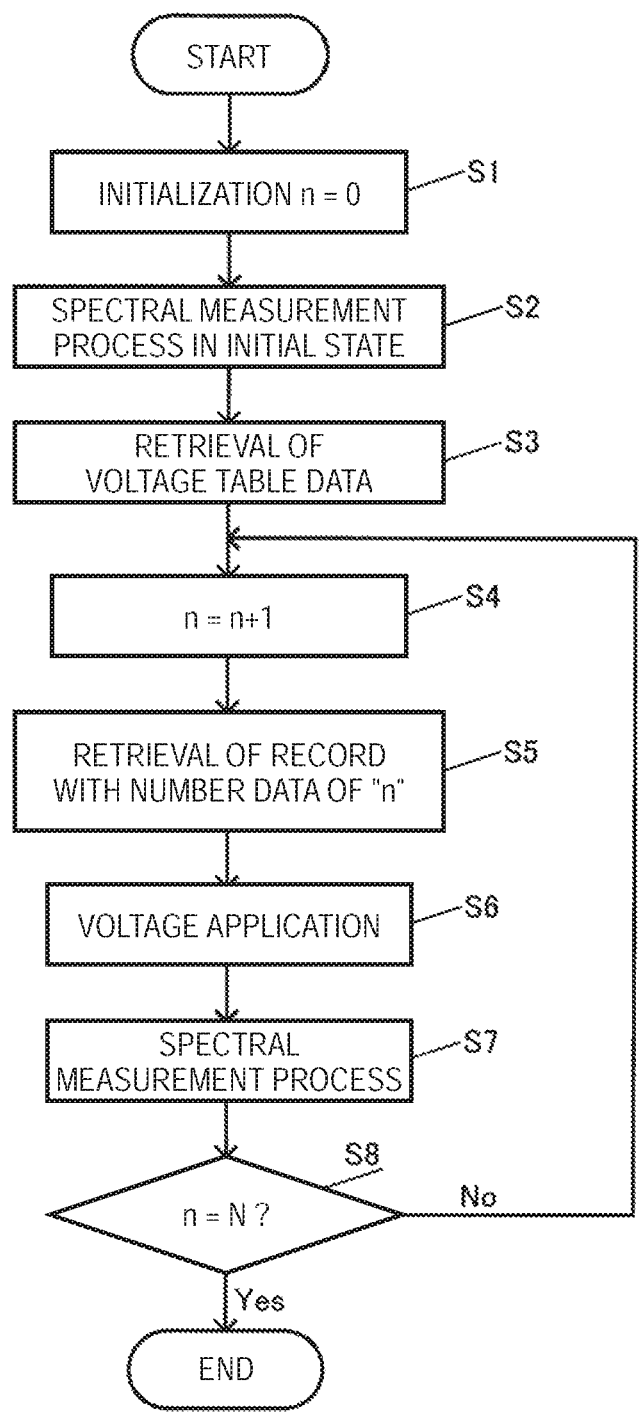
FIG. 20 is a flowchart showing spectrometric measurement operation in the instrument shown in FIG. 19.

FIG. 20 is a flowchart showing the spectral measurement operation of the spectral measurement device 203. Firstly, the CPU 250 of the control circuit section 240 starts the voltage adjustment section 261, the light intensity recognition section 263, and the measurement section 264. Further, the CPU 250 initializes a measurement count variable "n" (set n=0) as an initial state (step S1). It should be noted that the measurement count variable n takes an integer value equal to or larger than 0.

Subsequently, the measurement section 264 measures (step S2) the intensity of the light beam transmitted through the etalon 10 in the initial state, namely the state in which no voltage is applied to the electrostatic actuators 80, 90. It should be noted that it is also possible to previously measure the dimension of the first gap G1 in the initial state, for example, at the time of manufacturing of the spectral measurement device and store it in the storage section 260. Then, the measurement section 264 outputs the intensity of the transmitted light beam and the dimension of the first gap in the initial state obtained here to the colorimetric control device 204.

Subsequently, the voltage adjustment section 261 retrieves (step S3) the voltage table data 265 stored in the storage section 260. Further, the voltage adjustment section 261 adds (step S4) "1" to the measurement count variable n.

Subsequently, the voltage adjustment section 261 obtains (step S5) the voltage data of the first and second electrodes 62, 64 and the voltage application period data corresponding to the measurement count variable n from the voltage table data 265. Then, the voltage adjustment section 261 outputs the drive control signal to the drive circuit 230 to thereby perform (step S6) the process of driving the electrostatic actuators 80, 90 in accordance with the data of the voltage table data 265.

Further, the measurement section 264 performs (step S7) the spectral measurement process at the application time elapse timing. Specifically, the measurement section 264 makes the light intensity recognition section 263 measure the intensity of the transmitted light. Further, the measurement section 264 performs the control of outputting the spectral measurement result, which includes the intensity of the transmitted light beam thus measured and the wavelength of the transmitted light beam in conjunction with each other, to the colorimetric control device 204. It should be noted that in the measurement of the light intensity, it is also possible to store the data of the light intensity of a plurality of times of measurement or all of the times of the measurement in the storage section 260, and then measure the light intensity of each of the turns of the measurement in a lump after the data of the light intensity of a plurality of times of measurement or all of the data of the light intensity has been obtained.

Subsequently, the CPU 250 determines (step S8) whether or not the measurement count variable n reaches the maximum value N, and if it determines that the measurement count variable n is equal to N, it terminates the series of spectral measurement operation. In contrast, if it is determined in the step S8 that the measurement count variable n is smaller than N, the CPU 250 returns to step S4 and performs the process of adding "1" to the measurement count variable n, and then repeats the process of the steps S5 through S8.

4. Optical Apparatus

Figure 21:
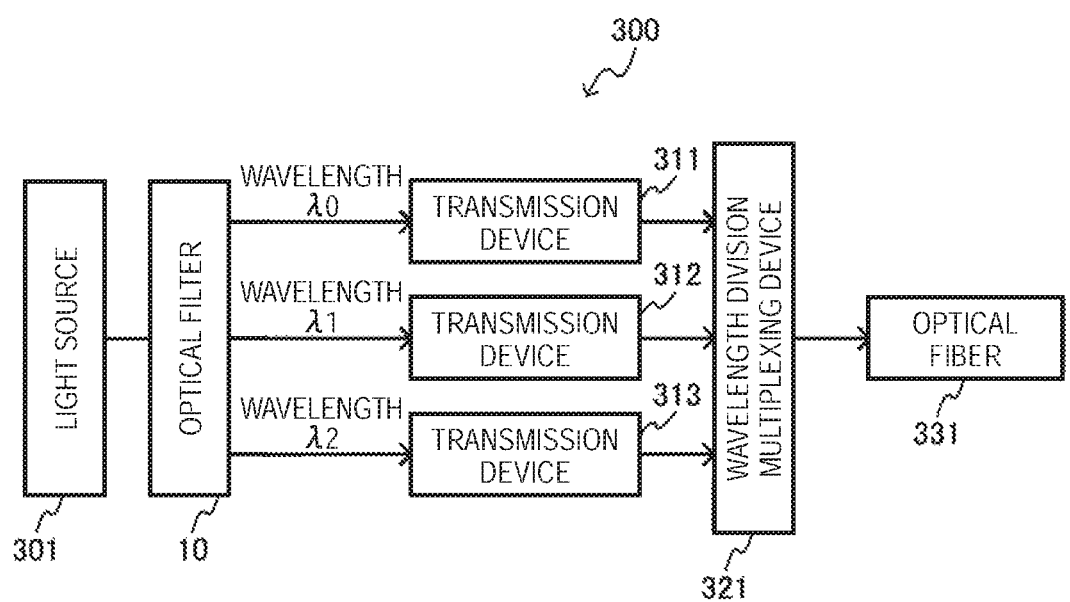
FIG. 21 is a block diagram of an optical apparatus of still another embodiment of the invention.

FIG. 21 is a block diagram showing a schematic configuration of a transmitter of a wavelength division multiplexing communication system as an example of an optical apparatus according to an embodiment of the invention. In the wavelength division multiplexing (WDM) communication, using the property of the light that the signals with respective wavelengths different from each other do not interfere each other, by using a plurality of light signals with respective wavelengths different from each other in a single optical fiber in a multiplexed manner, it becomes possible to increase the data transmission quantity without expanding the optical fiber lines.

In FIG. 21, a wavelength division multiplexing transmitter 300 has an optical filter 10 to which a light beam from a light source 301 is input, and a plurality of light beams with respective wavelengths $\lambda 0$, $\lambda 1$, $\lambda 2$, . . . is transmitted through the optical filter 10. Transmission devices 311, 312, and 313 are provided corresponding to the respective wavelengths. Optical pulse signals corresponding to a plurality of channels output from the transmission devices 311, 312, and 313 are combined by a wavelength division multiplexing device 321 into one signal, and then output to an optical fiber transmission channel 331.

The invention can also be applied to an optical code division multiplexing (OCDM) transmitter in a similar manner. This is because although in the OCDM the channels are discriminated by pattern matching of encoded optical pulse signals, the optical pulses constituting the optical pulse signals include light components with respective wavelengths different from each other.

Although some embodiments are hereinabove explained, it should easily be understood by those skilled in the art that various modifications not substantially departing from the novel matters and the effects of the invention are possible. Therefore, such modified examples should be included in the scope of the invention. For example, a term described at least once with a different term having a broader sense or the same meaning in the specification or the accompanying drawings can be replaced with the different term in any part of the specification or the accompanying drawings.

What is claimed is:

1. An optical filter comprising:
a first substrate;
a second substrate that opposes to the first substrate;
a first reflector that is disposed between the first substrate and the second substrate;
a second reflector that is disposed between the first reflector and the second substrate;
a first electrode that is disposed between the first substrate and the second substrate;
a second electrode that is disposed between the first substrate and the second substrate, the first electrode being disposed between the first reflector and the second electrode; and
a third electrode that is disposed between the first electrode and the second substrate, and that is disposed between the second electrode and the second substrate,
a first electrical potential difference being applicable between the third electrode and the first electrode,
a second electrical potential difference being applicable between the third electrode and the second electrode, and
the second electrical potential difference is independent from the first electrical potential difference.

2. The optical filter according to claim 1,
the first electrode and the second electrode being disposed on a first face of the first substrate,
the third electrode being disposed on a second face of the second substrate,
the first face opposing to the second face.

3. The optical filter according to claim 1,
the second substrate including a first portion and a second portion,
the second reflector overlapping to the first portion,
the second portion being disposed at an outside of the first portion,
the first portion being thicker than the second portion.

4. The optical filter according to claim 1,
the first electrode and the second electrode opposing to the third electrode.

5. The optical filter according to claim 1,
the third electrode including a fourth electrode and a fifth electrode,
the fourth electrode being electrically connected to the fifth electrode.

6. An optical filter module comprising:
the optical filter according to claim 1; and
a light receiving element that receives light from the optical filter.

7. An analytical instrument comprising:
the optical filter module according to claim 6; and
a controller that controls the optical filter module.

* * * * *